United States Patent
Andes et al.

(10) Patent No.: US 11,746,240 B2
(45) Date of Patent: Sep. 5, 2023

(54) INTERFERENCE PIGMENTS

(71) Applicant: Merck Patent GmbH, Darmstadt (DE)

(72) Inventors: Stephanie Andes, Darmstadt (DE);
Ulrich Schoenefeld, Darmstadt (DE);
Thomas Krasemann, Darmstadt (DE);
Manfred Thon, Darmstadt (DE);
Martina Welsch, Darmstadt (DE); Ralf Schweinfurth, Darmstadt (DE);
Melanie Mechthild Breidung, Wilmington, DE (US)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/296,790

(22) PCT Filed: Sep. 25, 2020

(86) PCT No.: PCT/EP2020/076874
§ 371 (c)(1),
(2) Date: May 25, 2021

(87) PCT Pub. No.: WO2021/063823
PCT Pub. Date: Apr. 8, 2021

(65) Prior Publication Data
US 2022/0356356 A1 Nov. 10, 2022

(30) Foreign Application Priority Data
Oct. 2, 2019 (DE) .......................... 102019006869.6

(51) Int. Cl.
*C09C 1/00* (2006.01)
(52) U.S. Cl.
CPC .......... *C09C 1/0039* (2013.01); *C09C 1/0021* (2013.01); *C09C 2200/1004* (2013.01); *C09C 2200/301* (2013.01)

(58) Field of Classification Search
CPC ................ C09C 1/0039; C09C 1/0021; C09C 2200/1004; C09C 2200/301; C09C 1/62
See application file for complete search history.

(56) References Cited

U.S. PATENT DOCUMENTS

| 7,156,913 | B2 | 1/2007 | Pfaff et al. | |
| 2006/0070552 | A1* | 4/2006 | Loch | C04B 35/01 |
| | | | | 106/404 |
| 2006/0156949 | A1 | 7/2006 | Pfaff et al. | |
| 2009/0220557 | A1 | 9/2009 | Pfaff et al. | |
| 2011/0300200 | A1 | 12/2011 | Pfaff et al. | |
| 2015/0259538 | A1* | 9/2015 | Honeit | C09C 3/063 |
| | | | | 427/108 |

FOREIGN PATENT DOCUMENTS

| EP | 1681318 A2 | 7/2006 |
| WO | 2007/057111 A2 | 5/2007 |

OTHER PUBLICATIONS

International Search Report dated Nov. 30, 2020 issued in corresponding PCT/EP2020/076874 application (2 pages).

* cited by examiner

*Primary Examiner* — Pegah Parvini
(74) *Attorney, Agent, or Firm* — MILLEN WHITE ZELANO AND BRANIGAN, PC; Csaba Henter

(57) ABSTRACT

The invention relates to interference pigments based on SiO$_2$ flakes having a broad layer-thickness distribution, and to the use thereof in paints, coatings, powder coatings, plastics and in particular in cosmetic formulations and for colouring food and pharmaceutical products.

18 Claims, No Drawings

INTERFERENCE PIGMENTS

The invention relates to interference pigments based on $SiO_2$ flakes having a broad layer-thickness distribution, and to the use thereof in paints, coatings, powder coatings, plastics and in particular in cosmetic formulations and for colouring food and pharmaceutical products.

Interference pigments based on flake-form substrates are employed in all areas of technology, in particular in the area of automotive paints, plastics, printing inks, in cosmetic formulations. In general, interference pigments consist of flake-form substrates which have particle sizes in the range 5-150 μm and are coated with one or more metal oxides, such as, for example, $TiO_2$ or $Fe_2O_3$, $Fe_3O_4$. The interference pigments have a uniform layer thickness here.

WO 93/08237 discloses effect pigments based on transparent silicon dioxide flakes which have a uniform layer thickness. The pigments described therein consist of thin $SiO_2$ flakes (thickness of the flakes from 50 μm to 5000 μm) which are covered with one or more metal-oxide layers.

Red effect pigments having high tinting strength based on $SiO_2$ flakes having a uniform layer thickness are described in DE102005002124. These pigments comprise $SiO_2$ flakes coated with iron oxide, where the total thickness of the pigments is not greater than 500 nm (±30 nm).

The metal oxide-coated $SiO_2$ flakes on the market with the trade name Xirona® from Merck KGaA consist of $SiO_2$ flakes of uniform thickness covered with a metal-oxide layer ($TiO_2$ or $Fe_2O_3$) having a thickness of 10 nm to 500 nm. The thicknesses of the $SiO_2$ flakes are in the range from 200 nm to 900 nm. Pigments of this type are distinguished, depending on the thickness of the flakes employed and the metal-oxide layer(s) applied and on the nature of the metal oxide, by particularly intense interference colours and by very strong angle-dependent colour-change effects, where the colour change takes place between 2-3 colours and the observer perceives colours of different intensity on changing his observation position relative to the pigmented object. However, it is problematic that an intense colour flop is not always desired in all applications. A further disadvantage is that it is not possible to prepare silver-white interference pigments based on $SiO_2$ flakes having one layer thickness.

The object of the present invention is the provision of interference pigments based on $SiO_2$ flakes which do not have the above-mentioned disadvantages.

Surprisingly, it has been found that the magnitude of the colour change can be controlled specifically in the case of interference pigments based on coated $SiO_2$ flakes having a broad layer-thickness distribution. The colour-flop behaviour can be matched to the respective application, from very pronounced to quite subtle, while retaining high colour purity and tinting strength.

It is even possible to suppress the colour flop to such an extent that neutral interference pigments, such as, for example, silver-white interference pigments, having high gloss and pure-white mass tone can be obtained.

The interference pigments based on $SiO_2$ flakes that are known from the prior art have a uniform layer thickness, while the interference pigments according to the invention are based on a mixture of $SiO_2$ flakes, where the flakes have at least 4, preferably 5, 6, 7 or 8, different layer thicknesses.

The present invention relates to interference pigments based on a mixture of $SiO_2$ flakes, where the flakes have at least 4 different layer thicknesses, and the mixture of $SiO_2$ flakes is coated with at least one high-refractive-index layer.

The interference pigments according to the invention are distinguished by high tinting strength and colour purity and have subtle colour-flop effects with a natural appearance. The more different layer thicknesses the mixture of $SiO_2$ flakes contains, the less pronounced the colour flop.

It is furthermore possible to suppress the colour change virtually completely in order to obtain neutral interference colours, for example a silver-white interference pigment.

The invention also relates to the use of the pigment mixture according to the invention in paints, coatings, printing inks, security printing inks, plastics, ceramic materials, glazes, glasses, as tracers, for the preparation of pigment preparations and dry preparations and in particular in cosmetic formulations and for colouring food preparations and food coatings, as well as for pharmaceutical preparations.

The size of the $SiO_2$ substrates is not crucial per se and can be matched to the particular application. In general, the flake-form substrates have a thickness distribution in the range from 0.1 to 2 μm, in particular from 0.2 to 4.5 μm and very particularly preferably from 0.2 to 1 μm. The size in the two other dimensions is usually 1 to 250 μm, preferably 2 to 200 μm and in particular 5 to 50 μm.

The substrate mixture employed is preferably $SiO_2$ flakes which have at least 4, preferably 5, 6, 7 or 8, different layer thicknesses. The individual layer thicknesses preferably differ by 10 nm, in particular by 15 nm and very particularly preferably by 20 nm.

In a preferred embodiment, the base substrate mixture consists of 6, 7 or 8 different $SiO_2$ flakes which differ in thickness.

Preferred mixtures of $SiO_2$ flakes have the following layer thicknesses:

360 nm
380 nm
400 nm
420 nm
440 nm
460 nm
480 nm
500 nm
or
360 nm
380 nm
400 nm
420 nm
440 nm
460 nm
480 nm
or
300 nm
320 nm
340 nm
360 nm
380 nm
400 nm
420 nm
440 nm
or
300 nm
310 nm
340 nm
350 nm
370 nm
380 nm
or
400 nm
420 nm
440 nm 460 nm
480 nm
500 nm
520 nm.

The $SiO_2$ flakes can be mixed with one another in any ratio, depending on the desired colour-flop effect. The more uniform the layer-thickness ratio of the mixture, for example (1:1:1:1:1 . . . ) and the higher the number of layer thicknesses used (>4), the more subtle the resultant colour transitions (colour-flop properties) of the interference pigments come out.

In a preferred embodiment, the mixing ratio of the $SiO_2$ flakes having
4 different layer thicknesses is 25% each
5 different layer thicknesses is 20% each
6 different layer thicknesses is 16.67% each
7 different layer thicknesses is 14.29% each
8 different layer thicknesses is 12.5% each
9 different layer thicknesses is 11.11% each
10 different layer thicknesses is 12.5% each,
where the sum of the mixture of $SiO_2$ flakes is always 100%.

In particular on use of at least 6 different layer thicknesses, it is possible to obtain interference pigments having purely neutral interference colours which have virtually no colour transition any longer, but exhibit high gloss.

In a very particularly preferred embodiment, the mixing ratio in the case of particularly preferred substrate mixtures is
12.5% of $SiO_2$ flakes having a particle thickness of 360 nm
12.5% of $SiO_2$ flakes having a particle thickness of 380 nm
12.5% of $SiO_2$ flakes having a particle thickness of 400 nm
12.5% of $SiO_2$ flakes having a particle thickness of 420 nm
12.5% of $SiO_2$ flakes having a particle thickness of 440 nm
12.5% of $SiO_2$ flakes having a particle thickness of 460 nm
12.5% of $SiO_2$ flakes having a particle thickness of 480 nm
12.5% of $SiO_2$ flakes having a particle thickness of 500 nm
or
20% of $SiO_2$ flakes having a particle thickness of 320 nm
20% of $SiO_2$ flakes having a particle thickness of 380 nm
20% of $SiO_2$ flakes having a particle thickness of 420 nm
20% of $SiO_2$ flakes having a particle thickness of 460 nm
20% of $SiO_2$ flakes having a particle thickness of 500 nm
or
5% of $SiO_2$ flakes having a particle thickness of 300 nm
10% of $SiO_2$ flakes having a particle thickness of 320 nm
10% of $SiO_2$ flakes having a particle thickness of 340 nm
25% of $SiO_2$ flakes having a particle thickness of 360 nm
25% of $SiO_2$ flakes having a particle thickness of 380 nm
10% of $SiO_2$ flakes having a particle thickness of 400 nm
10% of $SiO_2$ flakes having a particle thickness of 420 nm
5% of $SiO_2$ flakes having a particle thickness of 440 nm.

The mixing ratio refers to ratios by weight, based on the substrate mixture.

The $SiO_2$ flakes are preferably prepared as disclosed in WO 93/08237. With the aid of the belt process described therein, $SiO_2$ flakes of uniform thickness can be prepared. For the preparation of the base substrate mixture for the interference pigments according to the invention, the $SiO_2$ flakes of different thickness are mixed. In the next step, the $SiO_2$ flake mixture is then coated with at least one high-refractive-index layer.

However, it is also possible to coat $SiO_2$ flakes having a defined layer thickness with at least one high-refractive-index layer and subsequently to mix the coated $SiO_2$ flakes having different layer thicknesses.

In a preferred variant, the interference pigments according to the invention are prepared by coating an $SiO_2$ flake mixture having at least 4 different layer thicknesses with at least one high-refractive-index layer.

A high-refractive-index layer in this patent application is taken to mean layers having a refractive index of $n \geq 1.8$.

A low-refractive-index layer in this patent application is taken to mean layers having a refractive index of $n < 1.8$.

The interference pigments according to the invention can easily be prepared by the production of at least one high-refractive-index layer on the substrate mixture consisting of $SiO_2$ flakes having at least 4 different layer thicknesses. The high-refractive-index layer is preferably metal-oxide layers, metal layers and metal-sulfide layers. Suitable metal oxides are, in particular, $TiO_2$, $Fe_2O_3$, FeOOH, $Fe_3O_4$, $ZrO_2$, ZnO, $Cr_2O_3$, AgO, MnO, CuO, CoO, NiO, and mixtures of the said oxides.

Particularly preferred interference pigments are based on an $SiO_2$ flake mixture which has at least 4 different layer thicknesses and has been coated with one or more metal oxides from the group $TiO_2$, $Fe_2O_3$ or $Fe_3O_4$ or mixtures thereof or have a multilayer coating consisting of alternating high- and low-refractive-index layers, such as, for example, $TiO_2$—$SiO_2$—$TiO_2$ or $TiO_2$—$MgO*SiO_2$—$TiO_2$.

The metal-oxide layers are preferably applied by wet-chemical methods, where it is possible to use the wet-chemical coating methods developed for the preparation of pearlescent pigments; methods of this type are described, for example, in DE14 67 468, DE19 59 988, DE20 09 566, DE22 14 545, DE22 15 191, DE22 44 298, DE23 13 331, DE25 22 572, DE31 37 808, DE31 37 809, DE31 51 343, DE31 51 354, DE31 51 355, DE32 11 602, DE32 35 017 or also in further patent documents and other publications.

In the case of wet coating, the $SiO_2$ substrate mixture is suspended in water, and one or more hydrolysable metal salts are added at a pH which is suitable for hydrolysis, which is selected so that the metal oxides or metal oxide hydrates are precipitated directly onto the flakes without secondary precipitations occurring. The pH is usually kept constant by simultaneous metered addition of a base and/or acid. The pigments are subsequently separated off, washed and dried and optionally calcined, where the calcination temperature can be optimised with regard to the respective coating present. In general, the calcination temperatures are between 150 and 1000° C., preferably between 350 and 900° C. If desired, the interference pigments can be separated off, dried and optionally calcined after application of individual coatings and then resuspended for the precipitation of further layers.

Furthermore, the coating can also be carried out in a fluidised-bed reactor by gas-phase coating, where, for example, the processes proposed in EP 0 045 851 and EP 0 106 235 for the preparation of pearlescent pigments can be used correspondingly.

In a further embodiment, the interference pigments according to the invention have at least one high-refractive-index layer and at least one low-refractive-index layer or an alternating sequence of high- and low-refractive-index layers.

The metal oxide having a high refractive index employed is preferably titanium dioxide and/or iron oxide. The metal oxide having a low refractive index used is preferably $SiO_2$, $Al_2O_3$, MgO or $MgO*SiO_2$.

The titanium dioxide layers are preferably applied by the process described in U.S. Pat. No. 3,553,001.

An aqueous titanium salt solution is slowly added to a suspension, heated to about 50-100° C., of the material to be coated, and a substantially constant pH of about 0.5-5 is maintained by simultaneous metered addition of a base, such as, for example, aqueous ammonia solution or aqueous alkali metal hydroxide. As soon as the desired layer thickness of the $TiO_2$ precipitation has been reached, the addition of the titanium salt solution and the base is stopped.

This process, also called the titration process, is distinguished by the fact that an excess of titanium salt is avoided. This is achieved by only feeding to the hydrolysis an amount per time unit as is necessary for uniform coating with the hydrated $TiO_2$ and as can be taken up per time unit by the available surface of the particles to be coated. Hydrated titanium dioxide particles are therefore not formed and they are not precipitated on the surface to be coated.

If the interference pigments contain a $TiO_2$ layer, this can be in the rutile or anatase modification. It is preferably in the form of rutile. Rutilisation is known to the person skilled in the art and can be carried out, for example, as described in U.S. Pat. Nos. 4,038,099, 5,433,779, 6,626,989, WO 03/097749, U.S. Pat. Nos. 4,086,100, 4,867,794. Rutilisation using tin oxide, as disclosed, for example, in U.S. Pat. No. 4,867,794, is particularly preferred.

The thickness of the individual high- and low-refractive-index layers on the $SiO_2$ flake surface is generally 10 to 1000 nm, preferably 15 to 800 nm and in particular 20-600 nm. The total thickness of all layers on the $SiO_2$ flakes is preferably <3 μm.

"Layer" or "coating" in this application is to be taken to mean the complete enveloping of an $SiO_2$ flake.

The structure of particularly preferred interference pigments according to the invention is indicated below, where the substrate mixture is a mixture of at least 4 different $SiO_2$ flakes which differ in particle thickness:

substrate mixture+$TiO_2$
substrate mixture+$Fe_2O_3$
substrate mixture+FeOOH
substrate mixture+$Fe_3O_4$
substrate mixture+$TiO_2/Fe_2O_3$
substrate mixture+$TiO_2$+$Fe_2O_3$
substrate mixture+$TiO_2$+FeOOH
substrate mixture+$TiO_2$+$Fe_3O_4$
substrate mixture+$TiO_2$+$SiO_2$
substrate mixture+$Fe_2O_3$+$SiO_2$
substrate mixture+FeOOH+$SiO_2$
substrate mixture+$Fe_3O_4$+$SiO_2$
substrate mixture+$TiO_2$+$SiO_2/Al_2O_3$
substrate mixture+$TiO_2$+$Al_2O_3$
substrate mixture+$Fe_2O_3$+$Al_2O_3$
substrate mixture+FeOOH+$Al_2O_3$
substrate mixture+$Fe_3O_4$+$Al_2O_3$
substrate mixture+$Cr_2O_3$
substrate mixture+$SnO_2$
substrate mixture+$SiO_2$
substrate mixture+$ZrO_2$
substrate mixture+ZnO
substrate mixture+$TiO_2$+$SiO_2$+$TiO_2$
substrate mixture+$TiO_2$+$Al_2O_3$+$TiO_2$
substrate mixture+$TiO_2$+$MgO*SiO_2$+$TiO_2$
substrate mixture+$TiO_2$+$CaO*SiO_2$+$TiO_2$
substrate mixture+$TiO_2$+$Al_2O_3*SiO_2$+$TiO_2$
substrate mixture+$TiO_2$+$B_2O_3*SiO_2$+$TiO_2$
substrate mixture+$Fe_2O_3$+$SiO_2$+$TiO_2$
substrate mixture+$Fe_2O_3$+$SiO_2$+$TiO_2$
substrate mixture+$Fe_2O_3$+$SiO_2$+$Fe_2O_3$
substrate mixture+$Fe_2O_3$+$SiO_2$+$SnO_2$+$Fe_2O_3$
substrate mixture+$Fe_2O_3$+$Al_2O_3$+$TiO_2$
substrate mixture+$Fe_2O_3$+$Al_2O_3$+$Fe_2O_3$
substrate mixture+$Fe_2O_3$+$MgO*SiO_2$+$TiO_2$
substrate mixture+$Fe_2O_3$+$CaO*SiO_2$+$TiO_2$
substrate mixture+$Fe_2O_3$+$Al_2O_3*SiO_2$+$TiO_2$
substrate mixture+$Fe_2O_3$+$B_2O_3*SiO_2$+$TiO_2$
substrate mixture+$Fe_2O_3$+$MgO*SiO_2$+$Fe_2O_3$
substrate mixture+$Fe_2O_3$+$CaO*Si02$+$Fe_2O_3$
substrate mixture+$Fe_2O_3$+$Al_2O_3*SiO_2$+$Fe_2O_3$
substrate mixture+$Fe_2O_3$+$B_2O_3*SiO_2$+$Fe_2O_3$
substrate mixture+$TiO_2/Fe_2O_3$+$SiO_2$+$TiO_2$
substrate mixture+$TiO_2/Fe_2O_3$+$Al_2O_3$+$TiO_2$
substrate mixture+$TiO_2/Fe_2O_3$+$MgO*SiO_2$+$TiO_2$
substrate mixture+$TiO_2/Fe_2O_3$+$CaO*SiO_2$+$TiO_2$
substrate mixture+$TiO_2/Fe_2O_3$+$Al_2O_3*SiO_2$+$TiO_2$
substrate mixture+$TiO_2/Fe_2O_3$+$B_2O_3*SiO_2$+$TiO_2$
substrate mixture+$TiO_2$+$SiO_2$+$TiO_2/Fe_2O_3$
substrate mixture+$TiO_2/Fe_2O_3$+$SiO_2$+$TiO_2/Fe_2O_3$
substrate mixture+$TiO_2/Fe_2O_3$+$MgO*SiO_2$+$TiO_2/Fe_2O_3$
substrate mixture+$TiO_2$+$Al_2O_3$+$TiO_2/Fe_2O_3$
substrate mixture+$TiO_2$+$MgO*SiO_2$+$TiO_2/Fe_2O_3$
substrate mixture+$TiO_2$+$CaO*SiO_2$+$TiO_2/Fe_2O_3$
substrate mixture+$TiO_2$+$Al_2O_3*SiO_2$+$TiO_2/Fe_2O_3$
substrate mixture+$TiO_2$+$B_2O_3*SiO_2$+$TiO_2/Fe_2O_3$
substrate mixture+$TiO_2$+$Al_2O_3$+$Fe_2O_3$
substrate mixture+$TiO_2$+$MgO*SiO_2$+$Fe_2O_3$
substrate mixture+$TiO_2$+$CaO*SiO_2$+$Fe_2O_3$
substrate mixture+$TiO_2$+$Al_2O_3*SiO_2$+$Fe_2O_3$
substrate mixture+$TiO_2$+$B_2O_3*SiO_2$+$Fe_2O_3$
substrate mixture+$SnO_2$+$TiO_2$
substrate mixture+$SnO_2$+$Fe_2O_3$
substrate mixture+$SnO_2$+FeOOH
substrate mixture+$SnO_2$+$Fe_3O_4$.

The interference pigments according to the invention can also be provided with an organic or inorganic protective layer in order to improve the light, weather and chemical stability or in order to increase the compatibility in various media. Suitable post-coatings or post-treatments are, for example, silanes, silicones, adsorbent silicones, metal soaps, amino acids, lecithins, fluorine components, polyethylenes, collagen or the methods described in DE22 15 191, DE31 51 354, DE32 35 017 or DE33 34 598, EP 0 632 109, U.S. Pat. No. 5,759,255, DE43 17 019, DE39 29 423, EP 0 492 223, EP 0 342 533, EP 0 268 918, EP 0 141 174, EP 0 764 191, WO 98/13426 or EP 0 465 805. This post-coating further increases the chemical and photochemical stability or makes handling of the interference pigment, in particular incorporation into various media, easier. In order to improve the wettability, dispersibility and/or compatibility with the user media, it is possible to apply, for example, functional coatings of $SiO_2$ or $Al_2O_3$ or $ZrO_2$ or mixtures thereof to the pigment surface. Furthermore, organic post-coatings, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493, are possible. The additionally applied substances make up only about 0.1 to 5% by weight, preferably 0.5 to 3.0% by weight, of the entire pigment.

The post-coating of the interference pigments according to the invention can be carried out directly in a one-pot process onto the coating of the SiO$_2$ flakes. However, it is also possible firstly to isolate, optionally dry and calcine the interference pigment and subsequently to apply the post-coating.

The interference pigments according to the invention are compatible with a multiplicity of colour systems, preferably from the area of paints, coatings and printing inks, in particular security printing inks. Owing to the uncopyable optical effects, the pigments according to the invention can be used, in particular, in the production of forgery-proof documents of value, such as, for example, bank notes, cheques, cheque cards, credit cards, identity documents, etc. Furthermore, the interference pigments are also suitable for the laser marking of paper and plastics and for applications in the agricultural sector, for example for greenhouse sheeting.

The invention thus also relates to the use of the interference pigments according to the invention in formulations, such as paints, printing inks, coatings, plastics, ceramic materials, glasses and for cosmetic preparation.

It goes without saying that, for the various applications, the interference pigments according to the invention can advantageously also be used as a mixture with other effect pigments and pigments, such as, for example, transparent and opaque white, coloured and black pigments, and with flake-form iron oxides, organic pigments, holographic pigments, LCPs (liquid crystal polymers) and conventional transparent, coloured and black gloss pigments based on metal-oxide-coated mica and SiO$_2$ flakes, etc. The interference pigments can be mixed in any ratio with commercially available pigments and fillers.

Suitable flake-form colorants are, in particular, pearlescent pigments, in particular based on mica, SiO$_2$ flakes or Al$_2$O$_3$ flakes, which are only covered with one metal-oxide layer, metal-effect pigments (Al flakes, bronzes), optically variable pigments (OVPs), liquid-crystal polymer pigments (LCPs) or holographic pigments.

The spherical colorants include, in particular, TiO$_2$, coloured SiO$_2$, CaSO$_4$, iron oxides, chromium oxides, carbon black, organic coloured pigments, such as, for example, anthraquinone pigments, quinacridone pigments, diketopyrrolopyrrole pigments, phthalocyanine pigments, azo pigments, isoindoline pigments. The needle-shaped pigments are preferably BiOCl, coloured glass fibres, α-FeOOH, organic coloured pigments, such as, for example, azo pigments, β-phthalocyanine CI Blue 15.3, Cromophtal Yellow 8GN (Ciba-Geigy), Irgalith Blue PD56 (Ciba-Geigy), azomethine copper complex CI Yellow 129 or Irgazine Yellow 5GT (Ciba-Geigy).

The interference pigments according to the invention can furthermore be mixed with commercially available fillers. Fillers which may be mentioned are, for example, natural and synthetic mica, sodium potassium aluminium silicate, glass beads or glass powder, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances.

There are no restrictions regarding the particle shape of the filler. In accordance with requirements, it can be, for example, flake-form, spherical, needle-shaped, crystalline or amorphous.

The use concentration and the mixing ratio of the interference pigments, in particular with organic and inorganic coloured pigments and dyes, of natural or synthetic origin, such as, for example, chromium oxide, ultra-marine, spherical SiO$_2$ or TiO$_2$ pigments, are dependent on the application medium and the effect that is intended to be achieved.

The interference pigments according to the invention can advantageously be employed both in decorative and care cosmetics, such as, for example, in lipsticks, lip gloss, eyeliner, eye shadow, rouge, sunscreen, pre-sun and after-sun preparations, make-ups, body lotions, bath gels, soaps, bath salts, toothpaste, hair gels, (volume) mascara, nail varnishes, compact powders, shampoos, loose powders and gels, etc.

The concentration of the interference pigments in the use system to be pigmented is generally between 0.01 and 70% by weight, preferably between 0.1 and 50% by weight and in particular between 1.0 and 10% by weight, based on the total solids content of the system. It is generally dependent on the specific application and can be up to 100% in the case of loose powders. The use concentration of the interference pigment according to the invention extends from 0.01% by weight in shampoo to 70% by weight in compact powder. In the case of a mixture of the interference pigments with spherical fillers, for example SiO$_2$, the concentration can be 0.01-70% by weight in the formulation. The cosmetic products, such as, for example, nail varnishes, lipsticks, compact powders, shampoos, loose powders and gels, are distinguished by particularly pure interference colours or a subtle colour flop and interesting gloss effects.

The interference pigments according to the invention can of course also be combined in the formulations with cosmetic raw materials and assistants of any type. These include, inter alia, oils, fats, waxes, film formers, surfactants, antioxidants, such as, for example, vitamin C or vitamin E, stabilisers, odour intensifiers, silicone oils, emulsifiers, solvents, such as, for example, ethanol, or ethyl acetate or butyl acetate, preservatives and assistants which generally determine applicational properties, such as, for example, thickeners and rheological additives, such as, for example, bentonites, hectorites, silicon dioxides, Ca silicates, gelatines, high-molecular-weight carbohydrates and/or surface-active assistants, etc.

It is likewise possible to admix nanoscale dielectrics in order to improve the skin feel. Examples of admixtures of this type are Al$_2$O$_3$, SiO$_2$, ZnO or TiO$_2$, which are usually added in amounts of 0.01-15% of the formulation.

The formulations comprising the interference pigments according to the invention can belong to the lipophilic, hydrophilic or hydrophobic type. In the case of heterogeneous formulations having discrete aqueous and non-aqueous phases, the pigment mixtures according to the invention may in each case be present in only one of the two phases or alternatively distributed over both phases.

The pH of the formulations can be between 1 and 14, preferably between 2 and 11 and particularly preferably between 5 and 8.

No limits are set for the concentrations of the interference pigments according to the invention in the formulation. They can be—depending on the application—between 0.001 (rinse-off products, for example shower gels)—100% (for example gloss-effect articles for particular applications).

The interference pigments according to the invention can furthermore also be combined with cosmetic active compounds. Suitable active compounds are, for example, insect repellents, inorganic UV filters, such as, for example, TiO$_2$, UV A/BC protective filters (for example OMC, B3 and MBC), also in encapsulated form, anti-ageing active compounds, vitamins and derivatives thereof (for example vitamin A, C, E, etc.), self-tanning agents (for example DHA, erythrulose, inter alia), and further cosmetic active compounds, such as, for example, bisabolol, LPO, VTA, ectoin, emblica, allantoin, bioflavonoids and derivatives thereof.

Organic UV filters are generally incorporated into cosmetic formulations in an amount of 0.5 to 10 percent by weight, preferably 1 to 8%, and inorganic filters in an amount of 0.1 to 30%.

The cosmetic preparations comprising the interference pigment according to the invention may in addition comprise further conventional skin-protecting or skin-care active compounds. These can in principle be all active compounds known to the person skilled in the art. Particularly preferred active compounds are pyrimidinecarboxylic acids and/or aryl oximes.

Of the cosmetic applications, particular mention should be made of the use of ectoin and ectoin derivatives for the care of aged, dry or irritated skin. Thus, European patent application EP-A-0 671 161 describes, in particular, that ectoin and hydroxyectoin are employed in cosmetic preparations, such as powders, soaps, surfactant-containing cleansing products, lipsticks, rouge, make-up, care creams and sunscreen compositions.

Application forms of the cosmetic formulations which may be mentioned are, for example: solutions, suspensions, emulsions, PIT emulsions, pastes, ointments, gels, creams, lotions, powders, soaps, surfactant-containing cleansing compositions, oils, aerosols and sprays. Further application forms are, for example, sticks, shampoos and shower preparations. Any desired customary vehicles, assistants and, if desired, further active compounds may be added to the preparation.

Ointments, pastes, creams and gels may comprise the customary vehicles, for example animal and vegetable fats, waxes, paraffins, starch, tragacanth, cellulose derivatives, polyethylene glycols, silicones, bentonites, silica, talc and zinc oxide, or mixtures of these substances.

Powders and sprays may comprise the customary vehicles, for example lactose, talc, silica, aluminium hydroxide, calcium silicate and polyamide powder, or mixtures of these substances. Sprays may additionally comprise the customary propellants, for example chlorofluorocarbons, propane/butane or dimethyl ether.

Solutions and emulsions may comprise the customary vehicles, such as solvents, solubilisers and emulsifiers, for example water, ethanol, isopropanol, ethyl carbonate, ethyl acetate, benzyl alcohol, benzyl benzoate, propylene glycol, 1.3-butyl glycol, oils, in particular cottonseed oil, peanut oil, wheatgerm oil, olive oil, castor oil and sesame oil, glycerol fatty acid esters, polyethylene glycols and fatty acid esters of sorbitan, or mixtures of these substances.

Suspensions may comprise the customary vehicles, such as liquid diluents, for example water, ethanol or propylene glycol, suspending agents, for example ethoxylated isostearyl alcohols, polyoxyethylene sorbitol esters and polyoxyethylene sorbitan esters, microcrystalline cellulose, aluminium metahydroxide, bentonite, agar-agar and tragacanth, or mixtures of these substances.

Soaps may comprise the customary vehicles, such as alkali metal salts of fatty acids, salts of fatty acid monoesters, fatty acid protein hydrolysates, isothionates, lanolin, fatty alcohol, vegetable oils, plant extracts, glycerol, sugars, or mixtures of these substances.

Surfactant-containing cleansing products may comprise the customary vehicles, such as salts of fatty alcohol sulfates, fatty alcohol ether sulfates, sulfosuccinic acid monoesters, fatty acid protein hydrolysates, isothionates, imidazolinium derivatives, methyl taurates, sarcosinates, fatty acid amide ether sulfates, alkylamidobetaines, fatty alcohols, fatty acid glycerides, fatty acid diethanolamides, vegetable and synthetic oils, lanolin derivatives, ethoxylated glycerol fatty acid esters, or mixtures of these substances.

Face and body oils may comprise the customary vehicles, such as synthetic oils, such as, for example, fatty acid esters, fatty alcohols, silicone oils, natural oils, such as vegetable oils and oily plant extracts, paraffin oils, lanolin oils, or mixtures of these substances.

The cosmetic preparations can be in various forms. Thus, they can be, for example, a solution, a water-free preparation, an emulsion or micro-emulsion of the water-in-oil (W/O) type or oil-in-water (O/W) type, a multiple emulsion, for example of the water-in-oil-in-water (W/O/W) type, a gel, a solid stick, an ointment or also an aerosol. It is also advantageous to administer ectoins in encapsulated form, for example in collagen matrices and other conventional encapsulation materials, for example as cellulose encapsulations, in gelatine, wax matrices or liposomally encapsulated. In particular, wax matrices, as described in DE-A 43 08 282, have proven favourable. Preference is given to emulsions. O/W emulsions are particularly preferred. Emulsions, W/O emulsions and O/W emulsions can be obtained in a conventional manner.

Further embodiments are oily lotions based on natural or synthetic oils and waxes, lanolin, fatty acid esters, in particular triglycerides of fatty acids, or oily-alcoholic lotions based on a lower alcohol, such as ethanol, or a glycerol, such as propylene glycol, and/or a polyol, such as glycerin, and oils, waxes and fatty acid esters, such as triglycerides of fatty acids.

Solid sticks consist of natural or synthetic waxes and oils, fatty alcohols, fatty acids, fatty acid esters, lanolin and other fatty bodies.

If a preparation is formulated as an aerosol, the customary propellants, such as alkanes, fluoroalkanes and chlorofluoroalkanes, are generally used.

The cosmetic preparation can also be used to protect the hair against photochemical damage, in order to prevent colour changes, bleaching or damage of a mechanical nature. In this case, suitable formulation is as a rinse-out shampoo, lotion, gel or emulsion, the respective preparation being applied before or after shampooing, before or after colouring or bleaching or before or after permanent waving. It is also possible to select a preparation as lotion or gel for styling or treatment, as lotion or gel for brushing or blow-waving, as hair lacquer, permanent waving composition, dye or bleach for the hair. The preparation having light-protection properties may comprise adjuvants, such as surfactants, thickeners, polymers, softeners, preservatives, foam stabilisers, electrolytes, organic solvents, silicone derivatives, oils, waxes, antigrease agents, dyes and/or pigments which colour the composition itself or the hair, or other ingredients usually used for hair care.

The present invention likewise relates to formulations, in particular cosmetic formulations, which, besides the interference pigments according to the invention, [lacuna] at least one constituent selected from the group of the absorbents, astringents, antimicrobial substances, antioxidants, antiperspirants, anti-foaming agents, antidandruff active compounds, antistatics, binders, biological additives, bleaches, chelating agents, deodorants, emollients, emulsifiers, emulsion stabilisers, dyes, humectants, film formers, fillers, fragrances, flavours, insect repellents, preservatives, anticorrosion agents, cosmetic oils, solvents, oxidants, plant constituents, buffer substances, reducing agents, surfactants, propellant gases, opacifiers, UV filters, UV absorbers, denaturing agents, aloe vera, avocado oil, coenzyme Q10, green tea extract, viscosity regulators, perfume, vitamins.

Furthermore, the interference pigments according to the invention can be employed for colouring pharmaceutical and food products by addition of the interference pigments according to the invention, optionally with further colourants, such as, for example, natural or nature-identical dyes, in the desired mixing ratios, to the product to be coloured in amounts of 0.005 to 15% by weight, preferably 0.01 to 100% by weight.

The admixing of natural or nature-identical dyes, organic or inorganic coloured pigments or colouring natural fruit and plant extracts, cocoa, colouring food extracts, such as, for example, vegetable black, spirulina, that have been approved for the foods sector, enables the optical effect of the interference pigment in the product to be influenced and at the same time novel iridescent colour effects can be achieved.

Suitable natural or nature-identical dyes are, in particular, E101, E104, E110, E124, E131, E132, E140, E141, E151, E160a. Furthermore, it is also possible to admix other coloured pigments with the flake-form effect pigments, such as, for example, E171, E172, E153.

The invention therefore relates to all formulations from the foods and pharmaceuticals sector which comprise the interference pigment according to the invention, alone or in combination with other pigments/pigment mixtures or dyes (natural or nature-identical), as colourants.

Besides the interference pigments according to the invention, the proportion of dyes, based on the food or pharmaceutical product, is preferably in the range from 0.5 to 25% by weight. The dye employed can likewise be colouring food/fruit and plant extracts, such as, for example, carrot juice, beetroot juice, elderberry juice, hibiscus juice, spinach, paprika extract, aronia extract and spirulina.

The total concentration of all pigments in the product to be pigmented should not exceed 50% by weight, based on the product. It is generally dependent on the specific application.

Various active-compound additives, such as, for example, vitamins, enzymes, trace elements, proteins, carbohydrates, essential fats and/or minerals, can also be added to the food and pharmaceutical products, where the total amount of active compounds, based on the food or pharmaceutical product, should not exceed 25% by weight. The amount of active compounds or active-compound mixtures is preferably 0.01-20% by weight, based on the product.

The products are coloured by adding the interference pigment according to the invention, alone or in combination with further pigments or colorants, to the product to be coloured, directly or in the presence of water and/or an organic solvent in the desired mixing ratios, simultaneously or successively, during or after the preparation thereof, before or after shaping (for example in the case of extrusion, pelleting, expansion, granulation, etc.). Admixing of the interference pigments according to the invention with pulverulent or loose powders is likewise possible.

The interference pigment according to the invention can also be applied to the surface in order to colour the food and pharmaceutical products after shaping. In this case, the interference pigment is generally mixed with an application medium and subsequently applied to the product using suitable application and spray devices. The application or coating composition then provides the corresponding adhesion of the interference pigments to the product surface. The latter is then coloured correspondingly. The application medium or coating composition preferably comprises the interference pigment according to the invention in amounts of 0.005-20% by weight, based on the application medium or coating composition.

It is furthermore also possible to apply the pigment mixture according to the invention to a fat-based coating applied beforehand on ice cream or similar frozen products. In this case, the ice cream to be coloured is firstly dipped into a fat-containing coating or coated with the latter. Before the coating solidifies on the frozen ice cream, the interference pigment according to the invention in the form of a powder is applied pneumatically or atomised/sprayed directly onto the still slightly liquid, not yet solidified surface. The interference pigment therefore directly reaches the surface of the product to be coloured. Further adhesion then occurs due to the ongoing temperature-induced solidification of the fat, caused by the frozen ice cream core or the frozen product. The resultant gloss has therefore been applied in an optically optimal manner, since it has not been incorporated into an application medium in this case. Accordingly, absolutely no reduction in gloss/colour due to coating or application compositions occurs.

The interference pigment according to the invention can, however, also be incorporated directly into the coating or application composition, and the pigmented coating or application composition is subsequently applied to the food, for example to ice cream, chocolate products, bakery products, etc.

Suitable as fat composition are all customary vegetable or animal fat types having a suitable melting or solidification point, cocoa butter and mixtures with chocolate types and fats. The interference pigments according to the invention can also be applied directly to the chocolate coating or fat glaze without an additional fat coating having to be applied for adhesion.

In the case of application of interference pigments by means of a liquid or viscous suspension, the interference pigments according to the invention are firstly suspended in a liquid to viscous medium. This suspension is subsequently applied to the products. Such media are generally all liquid or viscous industrially manufactured glaze products, sealants, such as, for example, shellac, thickeners, such as, for example, gum arabic, film formers, such as, for example, cellulose derivatives or starch.

In the case of incorporation into the product matrix itself, the amount of the interference pigment according to the invention used is preferably 0.5-40% by weight, in particular 1-30% by weight. In the case of the surface colouring of food and pharmaceutical products, the amount used in the colouring or coating solution used is in the range 0.1-25% by weight, in particular 1-15% by weight. In the case of the use of the interference pigment according to the invention in pulverulent products, the use range is 0.05-50% by weight, in particular 2-10% by weight.

The coating solutions preferably comprise water or organic solvents, such as, for example, ethanol or isopropanol. The film former employed in the coating solutions is preferably a cellulose derivative, such as, for example, hydroxypropylmethylcellulose. Particular preference is given to application solutions comprising cellulose derivatives which, instead of water, comprise 5-80% by weight of a suitable organic solvent.

Compared with aqueous coating solutions, the alcoholic or alcoholic-aqueous, cellulose-containing application solutions have significant applicational advantages:

use of cooler drying air during the spray application colouring of heat-sensitive products, such as, for example, vitamin-containing foods, with the interference pigments according to the invention is very readily possible.

Products suitable for colouring that may be mentioned are, in particular, coatings on all types of foods, in particular pigmented sugar and shellac coatings (alcoholic and aqueous), coatings with oils and waxes, with gum arabic and with cellulose grades (for example HPMC=hydroxypropyl-methylcellulose), with starch and albumin derivatives, carrageenan and other substances known to the person skilled in the art which are suitable for coating. The interference pigment according to the invention is generally mixed with the application medium here and subsequently applied to the food or pharmaceutical product using suitable application and spray devices, or by hand. The application or coating composition then ensures the corresponding adhesion of the interference pigments to the food or pharmaceutical product surface. The latter is then coloured correspondingly. The application and coating solutions preferably comprise 0.1-20% by weight, in particular 2-15% by weight, of the interference pigment according to the invention.

Preferred dry powder mixtures for coatings comprise a cellulose derivative, such as, for example, hydroxypropylmethylcellulose, sodium carboxymethylcellulose, a release agent, such as, for example, lecithin or stearic acid, a gloss enhancer, such as, for example, maltodextrin and/or dextrose, and the interference pigment according to the invention. Dry powder mixtures of this type preferably comprise the interference pigment according to the invention in amounts of 0.01-50% by weight, in particular 0.5-40% by weight, based on the powder mixture. If necessary, dyes, flavourings, vitamins, sweeteners, etc., can be added to these dry powder mixtures.

Furthermore, it is possible to colour liquid, edible coating systems consisting of food additives and food colours with the interference pigments according to the invention. The pigmented liquid and edible lacquer systems (=decorative lacquer) can be used to colour, for example, insides of glasses and other containers intended for the accommodation of liquid, pasty or also solid foods. The lacquer can be poured into the container or distributed, sprayed or applied in a targeted manner by means of a brush or similar. After a short time, the lacquer dries, and a glass or container which is either completely coloured or partly coloured on the inside is obtained.

If a liquid drink or pasty food is now introduced into the pre-decorated glass, the decorative coating slowly begins to dissolve, depending on the available water content. In the process, it slowly diffuses into the drink/food. The dissolution rates of the lacquer system can be adjusted or modified through the choice of the amount of binder in the lacquer itself. A relatively high binder content reduces the dissolution rate. The coloured decorative lacquer thus itself becomes a constituent of the food.

In addition to the interference pigments according to the invention, further soluble and insoluble, natural and synthetic food dyes, or colouring food/fruit and plant extracts can be used in the lacquer system. Particular mention may be made here of E110, E120, E131, E133, E124, E140, E141, E127, E171, E170, E153, E129, E123, E160, E104, E100, E101, E150, E162, E155, spirulina, carrot extract, beetroot, aronia extract, elderberry extract, spinach extract and other colouring fruit and plant extracts. It is furthermore possible to add food flavours (natural, synthetic or nature-identical). Addition of sweeteners, such as, for example, cyclamate, saccharine, aspartame, acesulfame K, stevia, etc. or or combinations thereof is furthermore possible.

The adhesive or coating promoter used is a cellulose. This is preferably hydroxypropylmethylcellulose E464, low viscosity. However, it is also possible to use other types of cellulose, individually or in combination, such as, for example, methylcellulose, sodium carboxymethylcellulose. A corresponding functional film formation on the product surface is important here. The use of organic solvents, such as, for example, ethanol or isopropanol (pharmaceutical grade), is furthermore important. The use of ethanol and/or isopropanol in the lacquer system leads to very rapid drying-off, in particular in combination with an air drying system. The addition of silicon dioxide, which frequently improves the adhesion to the glass or container, in the lacquer systems is optional.

Products which are suitable for colouring or coating are, for example, edible paper, wafers, Easter eggs, sugar products, cake decorations, pressed tablets, dragees, chewing gums, gum products, fondant products, marzipan products, filling compositions, cocoa and fat glazes, chocolate and chocolate-containing products, ice cream, cereals, snack products, coating compositions, cake glazes, sugar sprinkles, nonpareils, jelly and gelatine products, sweets, liquorice, icing, candyfloss, fat, sugar and cream compositions, puddings, desserts, flan glaze, cold fruit soups, soft drinks and carbonated beverages, beverages with stabilising additives, such as, for example, carboxymethylcellulose, acidified and unacidified milk products, such as, for example, quark, yogurt, cheese, cheese rinds, sausage casings, etc. In the case of coated food and pharmaceutical products, it is possible to combine the interference pigment according to the invention with flavour substances (powder or liquid flavours), acids and/or with sweeteners, such as, for example, aspartame, in order additionally to reinforce the visual effect in terms of flavour.

Owing to their temperature stability, the interference pigments according to the invention can furthermore be employed as food dyes in hot, boiling oil or fat for the preparation and processing of corresponding foods. The temperature of the oils and fats coloured with the interference pigments according to the invention is preferably 80-220° C. The interference pigments according to the invention are incorporated directly into the oil or fat here. In the case of fats, this incorporation is possible both in the liquid and pasty state. Regarding the choice of suitable oils and fats, all hydrogenated and unhydrogenated oils and fats which are suitable for the processing and preparation of foods come into consideration, for example palm fat, coconut fat, rapeseed oil, sunflower oil, olive oil, thistle oil and mixtures thereof. The use concentration of the interference pigments according to invention in the oils and fats is 0.5-20% by weight, preferably 2-10% by weight, based on the oil or fat employed.

Foods which are suitable for this type of application are, for example, potato products, such as, for example, French fries, potato wedges, croquettes, meat and fish products, such as, for example, escalopes, fish fingers, chicken nuggets, vegan and vegetarian meat substitute products, squid rings, vegetable products, such as, for example, spring rolls, bakery products, such as, for example, doughnuts, quark balls snack products, such as, for example, potato chips convenience products.

Regarding the equipment and apparatuses required, all frying and boiling equipment known to the person skilled in the art can be used for this application. Solely in the case of frying/boiling itself, it must be ensured that the interference pigments according to the invention are distributed uniformly in the oil/fat during the exposure time. Occasional stirring during the treatment or stirring-up before beginning the frying ensures good pigment distribution. In the case of relatively large equipment, a suitable circulation pump or a stirrer, for example, is advisable. Use of the fats or oils coloured with the interference pigments in the pan is of course also possible.

A further major area of application is in the pharmaceutical and OTC sector for colouring or as a coating for tablets, gelatine capsules, dragees, ointments, cough mixture, etc. In combination with conventional coatings, such as polymethacrylates and cellulose grades, for example HPMC, the interference pigment according to the invention can be employed in a variety of ways for colouring and finishing the products.

The invention therefore also relates to formulations comprising the interference pigment according to the invention.

The present invention likewise relates to formulations, in particular cosmetic formulations, which, besides the interference pigments according to the invention, [lacuna] at least one constituent selected from the group of the absorbents, astringents, antimicrobial substances, antioxidants, antiperspirants, antifoaming agents, antidandruff active compounds, anti-statics, binders, biological additives, bleaches, chelating agents, deodorants, emollients, emulsifiers, emulsion stabilisers, dyes, humectants, film formers, fillers, fragrances, flavours, insect repellents, preservatives, anticorrosion agents, cosmetic oils, solvents, oxidants, plant constituents, buffer substances, reducing agents, surfactants, propellant gases, opacifiers, UV filters, UV absorbers, denaturing agents, aloe vera, avocado oil, coenzyme Q10, green tea extract, viscosity regulators, perfume, vitamins, enzymes, trace elements, proteins, carbohydrates, essential fats, minerals, natural dyes, nature-identical dyes, vegetable black, acids, sugars, fats, flavour enhancers, film formers, sweeteners, colouring food/fruit and plant extracts, spirulina, cocoa, wax, gum arabic, cellulose, cellulose derivatives, starch, albumen and albumen derivatives, carrageenan.

The following examples are intended to explain the invention, but without limiting it.

EXAMPLES

Example 1

100 g of a mixture of $SiO_2$ flakes (particle size 5-50 μm) of the composition 12.5% of $SiO_2$ flakes having a particle thickness of 360 nm 12.5% of $SiO_2$ flakes having a particle thickness of 380 nm 12.5% of $SiO_2$ flakes having a particle thickness of 400 nm 12.5% of $SiO_2$ flakes having a particle thickness of 420 nm 12.5% of $SiO_2$ flakes having a particle thickness of 440 nm 12.5% of $SiO_2$ flakes having a particle thickness of 460 nm 12.5% of $SiO_2$ flakes having a particle thickness of 480 nm 12.5% of $SiO_2$ flakes having a particle thickness of 500 nm 12.5% of $SiO_2$ flakes having a particle thickness of 360 nm in 2000 ml of demineralised water are warmed to 75° C. with stirring. The pH of the suspension is then adjusted to 2.2 using hydrochloric acid (15% HCl). 360 g of a $TiOCl_2$ solution (400 g of $TiCl_4$/) are metered in at a metering rate of 2.0 ml/min at constant pH until the colour end point (silver) has been reached, during which the pH is kept constant at 2.2 by simultaneous dropwise addition of 32% sodium hydroxide solution (30% KOH). When the addition is complete, the mixture is stirred for a further 10 min, the suspension is filtered off with suction and washed with deionised water until salt-free. After drying at 120° C., the pigment is calcine at 850° C. for 45 min, giving a silver-white interference pigment mixture with a subtle interference rosé shade, excellent gloss and pure-white mass tone.

Example 2

100 g of a mixture of $SiO_2$ flakes (particle size 5-50 μm) of the composition

20% of $SiO_2$ flakes having a particle thickness of 320 nm

20% of $SiO_2$ flakes having a particle thickness of 380 nm

20% of $SiO_2$ flakes having a particle thickness of 420 nm

20% of $SiO_2$ flakes having a particle thickness of 460 nm

20% of $SiO_2$ flakes having a particle thickness of 500 nm with 2000 ml of deionised water are warmed to 75° C. with stirring. The pH is adjusted to 1.8 by dropwise addition of $SnCl_4$ solution (22 g/l). The remainder of 100 ml of $SnCl_4$ solution (22 g/l) is subsequently metered in, during which the pH is kept constant at 1.8 using 32% sodium hydroxide solution. When the addition is complete, the mixture is stirred for a further 10 min. 345 ml of a $TiOCl_2$ solution (400 g of $TiCl_4$/) are then metered in at constant pH until the colour end point (silver) has been reached, during which the pH is kept constant at 1.8 by simultaneous dropwise addition of 32% sodium hydroxide solution. When the addition is complete, the mixture is stirred for a further 10 min, the suspension is filtered off with suction and washed with deionised water until salt-free. After drying at 120° C., the pigment is calcined at 850° C. for 45 min, giving an intensely coloured blue interference pigment having a subtle flop into reddish and a pure-white mass tone.

Example 3

100 g of a mixture of $SiO_2$ flakes (particle size 5-50 μm) of the composition

5% of $SiO_2$ flakes having a particle thickness of 300 nm

10% of $SiO_2$ flakes having a particle thickness of 320 nm

10% of $SiO_2$ flakes having a particle thickness of 340 nm

25% of $SiO_2$ flakes having a particle thickness of 360 nm

25% of $SiO_2$ flakes having a particle thickness of 380 nm

10% of $SiO_2$ flakes having a particle thickness of 400 nm

10% of $SiO_2$ flakes having a particle thickness of 420 nm

5% of $SiO_2$ flakes having a particle thickness of 440 nm with 1500 ml of deionised water are warmed to 75° C. with stirring. An $FeCl_3$ solution ($FeCl_3$ content: 5.4%) is added dropwise at a rate of 0.5 ml/min with a vigorous stirring at 75° C. and pH 3.0. The pH is kept constant by addition of dilute NaOH. After addition of 1100 ml, the product is filtered, washed with demineralised water until neutral, dried and calcined at 800° C. for 30 min, giving an interference pigment changing subtly between copper and gold and having an attractive rosé powder colour.

Use Examples

Example A1: Sugar-Coated Products—Shellac Application

Shellac (Capol® 425, Capol GmbH) is mixed with 2 parts of ethanol (food grade, min. 90% by vol.). 2-8% of interference pigment from Example 1 are subsequently added and mixed. The glossed, sugar-coated products are then introduced into a conventional coating pan.

Between 5 g and 20 g/kg of the mixture prepared above are then applied over the products rotating in the pan.

After a few minutes, drying air is directed over the products.

Sugar dragees having an additional silver-white gloss on the surface are obtained.

Example A2: Products Coated with Dark Chocolate—Application with Gum Arabic

Gum arabic solution (Capol 254, Capol GmbH) is mixed with 2-10% of interference pigment from Example 1. The non-glossy, chocolate-coated products are then introduced into a conventional coating pan.

Between 5 g and 10 g/kg of the gum arabic solution are then applied over the products rotating in the pan to the products rotating in the pan. After a few minutes, drying air is directed over the products.

Chocolate dragees having a silver-white gloss on the surface are obtained.

Example A3: Sugar-Coated, White Chewing Gum—Film Coating

Preparation of the Film Coating Solution:

5% of HPMC film coating powder compound (Biogrund GmbH) are firstly mixed into 25% of ethanol (food grade, min 90% by vol.). 70% of cold water is then added. The mixture is stirred until the HPMC compound has completely dissolved.

2-10% of interference pigment from Example 1 are then added to the solution prepared in this way.

The chewing gums are introduced into a coating pan and set in rotation. The coating pan here must be provided with suitable baffles. A two-component spray gun or spray system is positioned in front of the opening of the coating pan. The requisite drying air is switched on.

Depending on the desired colour effect, 30-80 g/kg of the film coating solution are applied to the chewing gums by means of the spray gun White chewing gums having an additional, white gloss effect on the surface are obtained.

Example A4: Preparation of Hard Caramels

| Raw material | % | Sources of supply: |
| --- | --- | --- |
| Sugar | 41% | Südzucker |
| Water | 17.118% | |
| Glucose syrup | 41% of C* Sweet | Cerestar, Krefeld |
| Interference pigment from Example 1 | 0.082% (0.1% based on the casting composition) | |
| E 104 dil. 1:100 | 0.4% of Sikovit | BASF, Ludwigshafen |
| Flavour | 0.4% (banana 9/030388) | Dragaco, Holzminden |

The sugar is heated to 100° C. with the water, and glucose syrup is then added. The solution is subsequently heated to 145° C. After addition of the interference pigment, the colour solution and the flavour, the caramel solution is poured into greased moulds using a funnel. Finally, the mixture is allowed to cool for two hours. The interference pigment can either be mixed with the sugar or added as a mixture with the glucose syrup. This variant contains no acid since the caramelisation would consequently be too strong.

Yellow, transparent hard caramels having an additional silver-white gloss effect in the product itself are obtained.

Example A5: Preparation of Gelatine Articles

| Raw material | % | Sources of supply: |
| --- | --- | --- |
| Water | 10.48% | |
| Sugar | 31.45% | Südzucker |
| Glucose syrup | 31.45% of C*Sweet | Cerestar, Krefeld |
| Interference pigment from Example 1 | 0.38% (0.4% based on the pouring composition) | |
| Citric acid dil. 1:1 | 2.51% | Merck KGaA, Darmstadt |
| Gelatine | 7.86% of 260 Bloom | DGF, Eberbach |
| Water | 15.748% | |
| Flavour | 0.122% (blackcurrant 9/695750) | Dragoco, Holzminden |

Firstly, the gelatine is softened with double the amount of water at 60° C. Sugar and water are heated to 100° C., and the glucose syrup is then added. The mixture is heated further to 120° C. and then allow to cool to about 85° C. The interference pigment from Example 1, the citric acid, the flavour and the gelatine solution are stirred in, and the degassed gelatine mixture is filled into greased moulds using the funnel. The product is allow to cool for about 16 hours.

Further Embodiments

The interference pigment from Example 1 or Example 3 can again either already be mixed directly with the sugar or introduced with the glucose syrup.

Instead of pouring into moulds, the traditional technique with negative moulds in moulding powder can also be used here for the production of gelatine articles.

White fruit-gum products having an additional silver-white gloss effect in the product are obtained.

Example A6: Coating Von Tablets a) Starting weight 1 kg of white tablets d=8 mm, G=200 mg

| | Solution for film coating: | |
|---|---|---|
| 6% | Sepifilm ™ Lp10 (mixture of hydroxypropyl-methylcellulose, stearic acid and microcrystalline cellulose | Seppic |
| 5% | Interference pigment from Example 1 | |
| 89% | Water | |

Total amount applied: 200 g

This corresponds to 1.2 mg of polymer/cm$^2$ of tablet surface

Preparation of the film coating solution:

The interference pigment from Example 1 is stirred into water. Any additional dyes are subsequently added. Finally, the film former (HPMC) is scattered into the suspension. Due to the increasing viscosity, the stirring speed must also be increased accordingly. After about 40-60 minutes, the HPMC has completely dissolved and the solution can then be sprayed onto the tablets.

The spray application is carried out by means of customary standard coating methods.

White tablets having a glossy white film coating on the surface are obtained.

Example A7: Tablets

Preparation:

The colouring of tablets is carried out by means of the so-called film coating process, in which aqueous application solutions (systems with film formers, plasticisers, etc.) are sprayed continuously onto the tablets rotating in so-called coaters.

Example A7.1

Product to the coloured: white tablets
Composition of the coating solution:

| Component | Percentage proportion | Source of supply |
|---|---|---|
| Interference pigment from Example 1 | 5% | |
| Sepifilm ™ 050 | 5% | Seppic |
| Sepisperse ™ Dry Blue | 0.5% | Seppic |
| Water | 89.5% | |

Application rate: 15-20 g/kg of product

Blue tablets having a glossy white film coating on the surface are obtained.

Example A7.2

Product to be coloured: white tablets
Composition of the coating solution:

| Component | Percentage proportion | Source of supply |
|---|---|---|
| Interference pigment from Example 1 | 3% | |
| Opadry ® II, transparent | 5% | Colorcon |
| Water | 92% | |

Application rate: 5-10 g/kg of product

White tablets having a glossy white film coating on the surface are obtained.

Example A7.3

Product to be coloured: white tablets
Composition of the coating solution:

| Component | Percentage proportion | Source of supply |
|---|---|---|
| Interference pigment from Example 1 | 5% | |
| Aquapolish, transparent | 6% | Biogrund |
| Sepisperse Dry Black F | 0.5% | Seppic |
| Water | 89% | |

Application rate: 5-10 g/kg of product

Silver-coloured tablets having a glossy film coating on the surface are obtained

Example A7.4

Product to be coloured: white tablets
Composition of the coating solution:

| Component | Percentage proportion | Source of supply |
|---|---|---|
| Interference pigment from Example 3 | 5% | |
| Sepifilm ™ 050 | 5% | Seppic |
| Water | 90% | |

Application rate: 20-25 g/kg of product

The amount of application solution here depends both on the desired, effect and also on the polymer application rate required.

White tablets having a copper-gold, glossy film coating on the surface are obtained

Example A8: Eye Shadow Gel

Phase A

| Raw material | Source of supply | INCI | [%] |
|---|---|---|---|
| Interference pigment from Example 2 | Merck KGaA/Rona® | | 15.00 |
| Micronasphere® M | Merck KGaA/Rona® | MICA, SILICA | 8.00 |
| Carbopol Ultrez 21 | Noveon | ACRYLATES/C10-30 ALKYL ACRYLATE CROSSPOLYMER | 0.40 |
| Citric acid monohydrate | Merck KGaA/Rona® | CITRIC ACID | 0.00 |
| Water | | AQUA (WATER) | to 100 |

Phase B

| Raw material | Source of supply | INCI | [%] |
|---|---|---|---|
| Glycerin | Merck KGaA/Rona® | GLYCERIN | 3.00 |
| Preservative | | | q.s. |
| Triethanolamine | | TRIETHANOLAMINE | 0.70 |
| Water | | AQUA (WATER) | 13.00 |

Phase C

| Raw material | Source of supply | INCI | [%] |
|---|---|---|---|
| Lubrajel DV | | PROPYLENE GLYCOL, POLYGLYCERYL-METHACRYLATE | 5.00 |

Preparation:

Disperse interference pigment and Micronasphere® in the water of phase A. Acidify with a few drops of citric acid in order to lower the viscosity, scatter in Carbopol with stirring. After complete dissolution, slowly stir in the pre-dissolved phase B and subsequently phase C. Finally, adjust the pH to between 7.0-7.5.

Example A9: Powder Eye Shadow

Phase A

| Raw material | Source of supply | INCI | [%] |
|---|---|---|---|
| Interference pigment from Example1 | | | 30.00 |
| Talc | | TALC | 49.50 |
| Magnesium stearate | Merck KGaA/Rona® | MAGNESIUM STEARATE | 2.50 |
| Potato starch | Suedstaerke GmbH | SOLANUM TUBEROSUM (POTATO STARCH) | 7.50 |

Phase B

| Raw material | Source of supply | INCI | [%] |
|---|---|---|---|
| Isopropyl stearate | Cognis GmbH | ISOPROPYL STEARATE | 9.34 |
| Cetyl palmitate | Merck KGaA/Rona® | CETYL PALMITATE | 0.53 |
| Ewalin 1751 | H. Erhard Wagner GmbH | PETROLATUM | 0.53 |
| Propyl 4-hydroxybenzoate | Merck KGaA/Rona® | PROPYLPARABEN | 0.10 |

Preparation:

Combine and pre-mix constituents of phase A. Subsequently add the molten phase B dropwise to the powder mixture with stirring. The powders are pressed at 40-50 bar.

Suntest:

In order to assess the light stability, half of the compact powder is covered during the exposure. The powders are then introduced into the Suntest (manufacturer: Hereaus Suntest CPS, 72 W/m² xenon lamp) for 8 hours. After exposure for 8 hours, no discoloration of the powder in the Suntest is observed. The silver-white pigment is absolutely light-stable.

Example A10: Lipstick

Phase A

| Raw material | Source of supply | INCI | [%] |
|---|---|---|---|
| Interference pigment from Example 2 | | | 12.00 |
| Ronastar® Purple Sparks | Merck KGaA/Rona® | Calcium Aluminum Borosilicate, CI77891 (Titanium dioxide), Silica, Tin Oxide | 3.00 |

Phase B

| Raw material | Source of supply | INCI | [%] |
|---|---|---|---|
| Beeswax | Merck KGaA/Rona® | Cera Alba (Beeswax) | 8.75 |
| Paracera C44 | Paramelt | COPERNICIA CERIFERA (CARNAUBA WAX), CERESIN | 5.25 |
| Adeps Lanae | Henry Lamotte GmbH | LANOLIN | 3.50 |
| Isopropyl myristate | Cognis GmbH | Isopropyl Myristate | 5.60 |
| Paraffin viscous | Merck KGaA/Rona® | PARAFFINUM LIQUIDUM (MINERAL OIL) | 2.10 |
| Castor oil | Henry Lamotte GmbH | RICINUS COMMUNIS (CASTOR OIL) | 59.65 |
| Oxynex® K liquid | Merck KGaA/Rona® | PEG-8, TOCOPHEROL, ASCORBYL PALMITATE ASCORBIC ACID, CITRIC ACID | 0.05 |
| Propyl 4-hydroxy-benzoate | Merck KGaA/Rona® | PROPYLPARABEN | 0.10 |

Preparation:

The constituents of phase B are heated to 75° C. and melted. The pigments of phase A are added, and everything is stirred well. The lipstick composition is then stirred for 15 minutes in the casting apparatus heated to 65° C. The homogeneous melt is poured into the casting mould which is pre-warmed to 55° C. The moulds are subsequently cooled, and the cold castings are removed. After warming of the lipsticks to room temperature, the lipsticks are briefly flame-treated.

Example A11: Nail Varnish

| Raw material | Source of supply | INCI | [%] |
|---|---|---|---|
| Interference pigment from Example 2 | | | 2.00 |
| Nailsyn ® Sterling 60 Silver | Merck KGaA/Rona ® | CI 77163 (Bismuth Oxychloride), Butyl Acetate, Nitrocellulose, Isopropyl Alcohol, Ethyl Acetate, Stearnalkonium Hectorite | 1.00 |
| Thixotropic nail varnish base 155 | Durlin/Bergerac NC | BUTYL ACETATE, ETHYL ACETATE NITROCELLULOSE, ACETYL TRIBUTYL CITRATE, PHTHALIC ANHYDRIDE/TRIMELLITIC ANHYDRIDE/GLYCOLS COPOLYMER, ISOPROPYL ALCOHOL, STEARALKONIUM HECTORITE, ADIPIC ACID/FUMARIC ACID/PHTHALIC ACID/TRICYCLODECANE DIMETHANOL COPOLYMER, CITRIC ACID | 97.00 |

Preparation:

The pigment and Nailsyn® Sterling 60 Silver are weighed out together with the varnish base, mixed well by hand using a spatula and subsequently stirred at 1000 rpm for 10 min.

Example A12: Volume Mascara

Phase A

| Raw material | Source of supply | INCI | [%] |
|---|---|---|---|
| Interference pigment from Example 3 | | | 10.00 |
| Ronaflair ® Silk Mica | Merck KGaA/Rona ® | MICA | 2.00 |

Phase B:

| Raw material | Source of supply | INCI | [%] |
|---|---|---|---|
| Dow Corning ® 556 | Dow Corning | PHENYL TRIMETHICONE | 2.00 |
| Tegosoft ® CT | Degussa-Goldschmidt AG | Caprylic Capric Triglyceride | 2.50 |
| Syncrowax ™ HRC | Croda GmbH | TRIBEHENIN | 3.50 |
| Tegin ® M | Degussa-Goldschmidt AG | Glyceryl Stearate | 3.50 |
| Beeswax | Merck KGaA/Rona ® | CERA ALBA (BEESWAX) | 3.00 |
| Stearic acid | Merck KGaA/Rona ® | STEARIC ACID | 5.00 |
| Phenonip™ | Nipa Laboratorien GmbH | PHENOXYETHANOL, BUTYLPARABEN, ETHYLPARABEN, PROPYLPARABEN, METHYLPARABEN | 0.80 |
| RonaCare ® tocopherol acetate | Merck KGaA/Rona ® | Tocopherol Acetate | 0.50 |
| Dermacryl ® 79 | Amerchol | ACRYLATES/OCTYL-ACRYLAMIDE COPOLYMER | 3.50 |

Phase C

| Raw material | Source of supply | INCI | [%] |
|---|---|---|---|
| Water (demineralised) | | AQUA (WATER) | 59.15 |
| AMP Ultra ® PC 1000 | Angus Chemie GmbH | AMINOMETHYL PROPANOL | 1.25 |
| 1,3-Butanediol | Merck KGaA/Rona ® | BUTYLENE GLYCOL | 1.00 |
| RonaCare ® Biotin Plus | Merck KGaA/Rona ® | UREA, DISODIUM PHOSPHATE, BIOTIN, CITRIC ACID | 0.50 |

Phase D

| Raw material | Source of supply | INCI | [%] |
|---|---|---|---|
| German ™ 115 | ISP Global Technologies | IMIDAZOLIDINYL UREA | 0.30 |
| Water (demineralised) | | AQUA (WATER) | 1.50 |

Preparation:

Melt all constituents of phase B apart from Demacryl 79 together at about 85° C., add Demacryl 79 with stirring and stir for 20 min until everything has homogeneously dispersed. Heat the constituents of phase C to about 85° C. Stir the interference pigment of phase A into phase C. Add phase C to phase B, continue stirring and homogenise at 8000 rpm for 1 min using an Ultra-Turrax T25. Allow to cool with stirring, and add phase D at 40° C.

Example A13: Soap

| Raw material | Source of supply | INCI | [%] |
|---|---|---|---|
| Interference pigment from Example 1 | | | 1.50 |
| Ronastar ® Noble Sparks | Merck KGaA/Rona ® | Calcium Aluminum Borosilicate, Silica, CI 77891 (Titanium Dioxide), Tin Oxide | 0.50 |
| Transparent soap base | Jean Charles (USA) | SODIUM PALMATE, SODIUM LAURETH SULFATE, SODIUM STEARATE, SODIUM MYRISTATE, | 98.00 |

-continued

| Raw material | Source of supply | INCI | [%] |
|---|---|---|---|
| | | SODIUM COCOYL ISETHIONATE, TRIETHANO-LAMINE, AQUA (WATER), GLYCERIN, SORBITOL, PROPYLENE GLYCOL, FRAGRANCE | |

Preparation:

All constituents are mixed homogeneously.

Example A14: Ice Cream on a Stick Coated with Dark Chocolate

| | | |
|---|---|---|
| (1) Fat coating: | | |
| 99.97% of fat compound (vegetable fat, sugar, lecithin, flavour) | Kerry GmbH | |
| 0.03% of vegetable black (E153) | Roha Ltd. | |
| (2) Interference pigment from Example 1 | | |

Brief dipping of the ice cream product (about upper third to middle) into the pre-coloured and warmed fat coating (1).

After withdrawal and brief dripping-off of the excess fat, the interference pigment is applied or sprayed uniformly onto the still-liquid ice cream surface by means of a pneumatic powder sprayer.

During this operation, the interference pigment is fixed on the surface by the fat which has now solidified completely. Application by means of a pneumatic application method gives a very uniform, high-gloss interference effect on the product surface at the same time as a very low dosing.

Example A15: Ice Cream on a Stick Coated with Dark Chocolate

| |
|---|
| (1) Fat coating: |
| 99.97% of fat compound (vegetable fat, sugar, lecithin, flavour) Kerry GmbH |
| 0.03% of 52% Carmine Red lake (E120) Fiorio Colori |

(2) Interference Pigment from Example 1

Brief dipping of the ice cream product (about upper third to middle) into the pre-coloured and warmed fat coating (1).

After withdrawal and brief dripping-off of the excess fat, the interference pigment is applied or sprayed uniformly onto the still-liquid ice cream surface by means of a pneumatic powder sprayer.

During this operation, the interference pigment is fixed on the surface by the fat which has now solidified completely. Application by means of a pneumatic application method gives a very uniform, high-gloss interfereence effect on the product surface at the same time as a very low dosing.

Example A16: Muffin with Coating (Dark Cocoa Glaze)

(1) Coating with dark cocoa fat glaze (2) direct application of the interference pigment analogously to Example A15 before solidification of the fat glaze.

A very uniform application is achieved by means of a pneumatic method.

Example A17: Fixing of Interference Pigments on Food Surfaces of by Means of Gum Arabic Solution a) Gum arabic solution
10% of gum arabic (Roeper GmbH)
15% of ethanol (96% by vol., Merck GmbH)
75% of water
Application to sugar dragees: 1%
Subsequent addition of pigment: 2% (interference pigment from Example A15)

b) Gum arabic solution
10% of gum arabic (Roeper GmbH)
15% of ethanol (96% by vol., Merck GmbH)
75% of water
Application to chocolate dragees: 0.8%
Subsequent addition of pigment: 1.8% (interference pigment from Example 3)

c) Gum arabic solution
12% of gum arabic (Roeper GmbH)
14% of ethanol (96 Vol.-1%, Merck GmbH)
74% of water
Application to chocolate-coated cereal sugar dragees: 1.2%
Subsequent addition of pigment: 2.1% (interference pigment from Example 3)

d) Gum arabic solution
10% of gum arabic (Roeper GmbH)
15% of ethanol (96 vol %, Merck GmbH)
8% of interference pigment from Example 1
68% of water
Spray application to chocolate bars by means of airbrush

Example A18: Fat-Containing Coating on Ice Cream

Example A18.1

| | |
|---|---|
| Fat compound 264-04-04 (vegetable fat, sugar, lecithin flavour) | 91% (Kerry) |
| Interference pigment from Example 1 | 7% |
| Cocoa (powder, high fat) | 2% (Stollwerck GmbH) |
| | 100% |

All components are mixed in the molten fat.

Example A18.2

| | |
|---|---|
| Fat compound 264-04-04 (vegetable fat, sugar, lecthin flavour) | 86% (Kerry) |

-continued

| | |
|---|---|
| Interference pigment from Example 1 | 8% |
| Cocoa (powder, high fat) | 6% (Stollwerck GmbH) |
| | 100% |

All components are mixed in the molten fat.

Example A18.3

| | |
|---|---|
| Fat compound 264-04-04 (vegetable fat, sugar, lecthin flavour) | 84% (Kerry) |
| Interference pigment from Example 1 | 8% |
| β-Carotin 32107 | 2% (Wild GmbH) |
| Cocoa (powder, high fat) | 6% (Stollwerck GmbH) |
| | 100% |

All components are mixed in the molten fat.

Example A18.4

| | |
|---|---|
| Fat compound 264-04-04 (vegetable fat, sugar, lecthin flavour) | 83.6% (Kerry) |
| Interference pigment from Example 1 | 8% |
| β-Carotin 32107 | 2% (Wild GmbH) |
| Paprika - oil-soluble color extract 32102 | 0.4% (Wild GmbH) |
| Cocoa (powder, high fat) | 6% (Stollwerck GmbH) |
| | 100% |

All components are mixed in the molten fat.

Example A18.5

| | |
|---|---|
| Fat compound 264-04-04 (vegetable fat, sugar, lecthin flavour) | 86% (Kerry) |
| Interference pigment from Example 3 | 8% |
| β-Carotin 32107 | 1% (Wild GmbH) |
| Cocoa (powder, high fat) | 5% (Stollwerck GmbH) |
| | 100% |

All components are mixed in the molten fat.

Example A19: Decoration of Bakery Products with a Fat-Containing Coating

| | |
|---|---|
| Fat compound 264-04-04 (vegetable fat, sugar, lecthin flavour) | 90% (Jancke GmbH) |
| Interference pigment from Example 1 | 8% |
| Cocoa (powder, high fat) | 2% (Stollwerck GmbH) |
| | 100% |

All components are mixed in the molten fat.

Example A20: Decoration of Chocolates with a Fat-Containing Coating

| | |
|---|---|
| Fat compound 264-04-04 (vegetable fat, sugar, lecthin flavour) | 90% (Jancke GmbH) |
| Interference pigment from Example 1 | 8% |
| Cocoa (powder, low fat) | 2% (Barry Callebaut) |
| | 100% |

All components are mixed in the molten fat.

Example A21: Edible Gloss Lacquer

Example A21.1: Golden Decoration Film in Vodka Liqueur, White, Transparent

Lacquer base (A):

| |
|---|
| 45% of ethanol (96% by vol.) (Merck KGaA) |
| 48.3% of water |
| 6% of hydroxypropylmethylcellulose, low viscosity (A&Z Chemicals) |

The cellulose is slowly added to the water/ethanol mixture with stirring (magnetic or propeller stirrer).

After a few minutes, the cellulose has dissolved sufficiently.

| |
|---|
| 0.1% of silicon dioxide (Aerosil ® 200F, Evonik GmbH) can now be added to the solution |
| 0.4% of sweetener solution (aspartame, acesulfame K) |
| 0.2% of vanilla flavour (Döhler GmbH) |
| 85% of lacquer base (A) |
| 15% of interference pigment from Example 3 |

Use:

Lacquer/pigment suspension is placed in a transparent drinking glass. The lacquer is then distributed homogeneously on the inside by shaking and agitation. After drying of the lacquer, the drink can be poured in. The lacquer dissolves slowly and at the same time releases the interference pigment, which is very easy to see optically in the drink.

Example A21.2: Strawberry Sparkling Wine+Red-Gold Effect

Lacquer base (B):

---
45% of ethanol (96% by vol.) (Merck KGaA)
48.9% of water
6% of hydroxypropylmethylcellulose, low viscosity (A&Z Chemicals)
---

The cellulose is slowly added to the water/ethanol mixture with stirring (magnetic or propeller stirrer)

After a few minutes, the cellulose has dissolved sufficiently.

---
0.1% of strawberry flavour (Döhler GmbH)
88% of lacquer base (B)
12% of interference pigment from Example 3
---

Use:

Lacquer/pigment suspension is placed in a transparent drinking glass.

The lacquer is then distributed homogeneously on the inside by shaking and agitation. After drying of the lacquer, the drink can be poured in. The lacquer dissolves slowly and at the same time releases the interference pigment, which is very easy to see optically in the drink.

Example A21.3: Silver Effect in Blue Curacao

Lacquer base (C):

---
45% of ethanol (96% vol.) (Merck KGaA)
51% of water
4% of hydroxypropylmethylcellulose, low viscosity (A&Z Chemicals)
The cellulose is slowly added to the water/ethanol mixture with stirring (magnetic or propeller stirrer)
90% of lacquer base (C)
10% of interference pigment from Example 1
---

Use:

Lacquer/pigment suspension is placed in a transparent drinking glass.

The lacquer is then distributed homogeneously on the inside by shaking and agitation. After drying of the lacquer, the drink can be poured in. The lacquer dissolves slowly and at the same time releases the interference pigment, which is very easy to see optically in the drink.

Example A21.4: Copper-Gold Effect in Coffee Liqueur

Lacquer base (D):

---
40% of ethanol (96% vol.) (Merck KGaA)
54.4% of water
5% of hydroxypropylmethylcellulose, low viscosity (A&Z Chemicals)
---

The cellulose is slowly added to the water/ethanol mixture with stirring (magnetic or propeller stirrer)

After a few minutes, the cellulose has dissolved sufficiently.

---
0.1% of silicon dioxide (Aerosil 200F, Evonik GmbH) can now be added to the solution.
0.2% of sweetener solution (aspartame, acesulfame K)
0.3% of caramel flavour (Döhler GmbH)
85% of lacquer base (D)
15% of interference pigment from Example 3
---

Use:

Lacquer/pigment suspension is sprayed into a transparent drinking glass.

After drying of the lacquer, the drink can be poured in. The lacquer dissolves slowly and at the same time releases the interference pigment, which is very easy to see optically in the drink.

Example A21.5: Copper-Coloured Effect in Vanilla Pudding

Lacquer base (E):

---
45% of ethanol (96% by vol.) (Merck KGaA)
49.6% of water
5% of hydroxypropylmethylcellulose, low viscosity (A&Z Chemicals)
---

The cellulose is slowly added to the water/ethanol mixture with stirring (magnetic or propeller stirrer).

After a few minutes, the cellulose has dissolved sufficiently.

---
0.1% of silicon dioxide (Aerosil 200F, Evonik GmbH) can now be added to the solution
0.3% of stevia (Wild GmbH)
86% of lacquer base (E)
14% of interference pigment from Example 3
---

Use:

Transparent dessert dish is decorated with the lacquer/interference pigment suspension by means of a brush. After drying of the lacquer, the prepared vanilla pudding can be placed in the glass.

Example A21.6: Glossy Pink Effect in Transparent Vodka Liqueur

Lacquer base (F):

---
45% of ethanol (96% by vol.) (Merck KGaA)
49.76% of water
5% of hydroxypropylmethylcellulose, low viscosity (A&Z Chemicals)
---

The cellulose is slowly added to the water/ethanol mixture with stirring (magnetic or propeller stirrer)

After a few minutes, the cellulose has dissolved sufficiently

---
0.04% of E120           (Pharmorgana GmbH)
0.2% of raspberry flavour   (Döhler GmbH)
85% of lacquer base (F)
15% of interference pigment from Example 1
---

Use:

Lacquer/pigment suspension is placed in a transparent drinking glass.

The lacquer is then distributed homogeneously on the inside by shaking and agitation. After drying of the lacquer, the drink can be poured in. The lacquer dissolves slowly and at the same time releases the interference pigment, which is very easy to see optically in the drink. Similarly, the soluble dye (E120) is also released and can likewise be seen in the class Example A22: Pigmentation of Frying Oils or Fats Example A22.1

Biskin frying fat (palm fat-based)
+5% of interference pigment from Example 1
Used in fryer for:
country potatoes (MC Cain)
French fries (Ja)
potato wedges (McCain)
potato powder (McCain)

Example A22.2

Palmetta (palm fat-based) (Walter Rau GmbH)
+10% of interference pigment from Example 1
Used in fryer for:
fish fingers, breaded (Kapitain Iglu)
escalopes, breaded (Ja)

Example A22.3

Flürin (rapeseed oil-based) (Walter Rau GmbH)
+6% of interference pigment from Example 1
Used in fryer for:
potato crisps Example A22.4

Flürin (rapeseed oil-based) (Walter Rau GmbH)
+6% of interference pigment from Example 3
Used in fryer for:
potato crisps
mini doughnuts
doughnuts Example A22.5

Sonin (sunflower oil-based) (Walter Rau GmbH)
+12% of interference pigment from Example 3
Used in fryer for:
spring rolls (Ja)

Example A22.6

Sonin (sunflower oil-based) (Walter Rau GmbH)
+5% of interference pigment from Example 2
used in fryer for:
potato wedges (McCain)

Example A22.7

Olive oil
+8% of interference pigment from Example 1
used for searing breaded escalopes, vegetarian and vegan meat substitute products (for example breaded soya escalopes or breaded soya medallions) and fish fingers Example A23: Gloss Lacquer for Use in Foods Example A23.1: Decoration of Chocolate Marshmallows Preparation of the base lacquer system:

| | |
|---|---|
| 45% of ethanol (96% by vol.) | Merck KGaA |
| 48.5% of water | |
| 6% of hydroxypropylmethylcellulose, low viscosity | A&Z Chemicals |

The cellulose is slowly added to the water/ethanol mixture with stirring (magnetic or propeller stirrer). After a few minutes, the cellulose has dissolved sufficiently.

| | |
|---|---|
| 0.15% of sunflower lecithin | Stern Chemie GmbH |
| 0.35% of silicon dioxide | Aerosil 200F, Evonik GmbH |
| can now be added to the solution. | |

Product to be decorated: chocolate marshmallows (Dickmann)
85% of base lacquer system (see above)
15% of interference pigment from Example 1
Use:
Chocolate marshmallows can be dipped, painted or coated.

Example A23.2: Decoration of Chocolate Marshmallows

Product to be decorated: chocolate marshmallows
90% of base coating system (see Example A23.1)
10% of interference pigment from Example 2
Use:
Chocolate marshmallows can be dipped, painted or coated.

Example A23.3: Product to be Cecorated: Cake Bars

88% of base coating system (see Example A23.1)
12% of interference pigment from Example 2
Use: partial coating Example A23.4: Product to be Decorated: Ladyfingers 85% of base coating system (see Example A23.1)
15% of interference pigment from Example 3
Dye E120 q.s.
Use: partial coating Example A23.5: Product to be Decorated: Bakery Products (Muffins)

85% of base coating system (see Example A23.1)
15% of interference pigment from Example 1
Use: dipping Example A23.6: Product to be Decorated: Stirred Cakes (Wikinger) (Marzipan/Cocoa Icing)

85% of base coating system (see Example A23.1)
15% of interference pigment from Example 1
Use: partial dipping Example A23.7: Product to be Decorated: Fruit Gums, Apple Fruit Pieces, Raisins, Strawberries 85% of base coating system (see Example A23.1)
15% of interference pigment from Example 3
Dye E131 q.s.
Use: dipping Example A23.8: Product to be Decorated: Meringue (Foam Biscuits Made from Sugar and Whipped Egg Whites)

85% of base coating system (see Example A23.1)
15% of interference pigment from Example 1
Vanilla flavour (Dohler GmbH) q.s.
Use: dipping and/or painting of the meringue Example A23.9: Product to be Decorated: Marshmallows 85% of base coating system (see Example A23.1)
15% of interference pigment from Example 1
Aspartame q.s.
Use: coating Example A23.10: Product to be Decorated: Pretzels 85% of base coating system (see Example A23.1)
15% of interference pigment from Example 1
Dye spirulina (GNT) q.s.
Use: dipping or immersion Example A23.11: Product to be Decorated: Ice Cream Cones 85% of base coating system (see Example A23.1)
15% of interference pigment from Example 2
Dye: E153 suspension (CHR Hansen) q.s.
Use: dipping or painting Example A23.12: Product to be Decorated: Pontefract Cakes 90% of base coating system (see Example A23.1)
10% of interference pigment from Example 1
Dye E129 q.s.
Use: hand application in rotating coating pan, subsequent feed of drying air
Addition 0.5-5%, depending on the desired effect Example A23.13: Product to be Decorated: Chocolate Dragees (Hazelnuts+Dark Chocolate (Weseke), Glazed 90% of base coating system (see Example A23.1)
10% of interference pigment from Example 3
Use: hand application in rotating coating pan, subsequent feed of drying air
Addition 0.5-8%, depending on the desired effect Example A23.14: Spray Application (Airbrush)

85% of base coating system (see Example A22.1)
15% of interference pigment from Example 2
A further 50% of water is added to this mixture: 100 g of mixture+50 g of water
Suspension is now sprayable.

Product to be decorated: sugar-coated white almonds (FDF GmbH)

Example A23.15: Spray Application (Airbrush, or in Coating Pan)

Preparation of the base lacquer system:
86% of ethanol
4% of hydroxypropylmethycellulose
10% of water
The cellulose is slowly added to the water/ethanol mixture with stirring (magnetic or propeller stirrer). After a few minutes, the cellulose has dissolved sufficiently.
90% of base lacquer system
10% of interference pigment from Example 1
Product to be decorated: sugar-coated white almonds (FDF GmbH)
Use: hand application in rotating coating pan, subsequent feed of drying air
Addition 0.5-5%, depending on the desired effect Example A24: Decoration of the Entire Surface of Chocolate and Chocolate Products with Interference Pigments without Spraying a)
Liquid edible food lacquer:
Base solution lacquer (without dye) [A]:
3% of HPMC—hydroxypropylmethylcellulose (A&Z Chemicals, Roeper GmbH)
0.5% of methylcellulose (Merck KGaA)
45% of ethanol (96% by vol., food grade)
51.5% of water
Methylcellulose and hydroxypropylmethylcellulose are mixed and added to the initially introduced ethanol with stirring. Stirring is continued continuously, and the water is added.
After a stirring time of 1.5 h, the lacquer system is ready.
The interference pigments according to the invention can now be stirred as desired into the lacquer solution prepared in this way. Furthermore, it is possible, in addition to the interference pigments, to add flavours and/or sweeteners of all types, natural dyes, for example E141 or synthetic dyes, for example E129, E131, E133, E124, E110 or colouring fruit and plant extracts.
90% of base solution lacquer (without dye) [A]+
10% of interference pigment from Example 2
Coating of chocolate marshmallows or dipping of chocolate bars
b)
92% of base solution lacquer (without dye) [A]+
8% of interference pigment from Example 1
Coating of chocolate marshmallows or dipping of gingerbreads coated with dark chocolate
c)
88% of base solution lacquer (without dye) [A]+
12% of interference pigment from Example 1
Coating of pralines
d)
90% of base solution lacquer (without dye) [A]+
10% of interference pigment from Example 3
Coating of pralines, dipping of chocolate bars (fat glaze)

e)
94% of base solution lacquer (without dye) [A]+
6% of interference pigment from Example 1
Coating of pralines and chocolate marshmallows
f)
Dipping of chocolate gingerbread cookies
93.6% of base solution lacquer (without dye) [A]+
6% of interference pigment from Example 1+
0.4% of E153 (Roha)
g)
Coating of pralines
90.98% of base solution lacquer (without dye) [A]+
9% of interference pigment from Example 1+
0.02% of E129 (Pharmorgana GmbH)
h)
Dipping of chocolate marshmallows
92% of base solution lacquer (without dye) [A]+
8% of interference pigment from Example 3+
0.1% of Spirulina Blue (CHR Hansen)
i)
*Coating of pralines*
85% of base solution lacquer (without dye) [A]+
15% of interference pigment from Example 1
j)
Dipping of marzipan
80% of base solution lacquer (without dye) [A]+
20% of interference pigment from Example 1
k)
Decoration of glasses (internal decoration)
80% of base solution lacquer (without dye) [A]+
20% of interference pigment from Example 1
l)
Dipping of chocolate shells
86% of base solution lacquer (without dye) [A]+
14% of interference pigment from Example 1

Example A25: Colouring of Wafers

Recipe and production process for all examples:
Composition:
10 kg of wheat flour (type 405), 17 l of water (15° C.), interference pigments and further components as indicated in the examples;
percentages are % by weight and are based on the total weight of the dough.
Mixing: 15 min in a planetary stirrer
Baking: 1-3 minutes at 200/220.° C. in a plate wafer iron Example A25.1: 2% of Interference Pigment from Example 1

Example A25.2: 4% of Interference Pigment from Example 1

Example A25.3: 6% of Interference Pigment from Example 1

Example A25.4: 8% of Interference Pigment from Example 1

On addition of 2% of interference pigment from Example A25.1, the interference colour is visible; very attractive gloss at 4% and 6%. An increase in the pigment concentration to 8% gives rise to only a slight improvement in the effect; slightly glittery effect.

Example A25.5: 5% of Interference Pigment from Example 1+0.03% of Vegetable Black E153

The combination with the black pigment E153 (vegetable black E153 Fiorio Colori SA) enables various silver shades to be achieved; the intensity of the silver shade is adjusted via the addition of E153.

Example A25.6: 5% of Interference Pigment from Example 1+0.02% of Carmine Red E120 (Fiorio Colori SA)

Wafers having a pink gloss are obtained.

Example A25.7: 5% of Interference Pigment from Example 1+1% of Beetroot E160 (Chr. Hansen A/S)

Colour intensity of the beetroot concentrate after the baking process is reduced; slight brownish tinge; no effect on interference colour and gloss visible.

Example A25.8: 5% of Interference Pigment from Example 1+0.8% of Flavour (Symrise GmbH)+0.5% of Aspartame Sweetener (Worlee GmbH)

The simultaneous use of the sweetener and flavour does not result in any impairment of the resultant gloss effect. The flavour and sweetener can easily and clearly be tasted.

Example A26: Colouring of Hard-Boiled Eggs

Application medium:

| | |
|---|---|
| 80% by weight of water | |
| 5.75% by weight of 1,2 propanediol E1520 | Merck KGaA |
| 2.4% by weight of sodium carboxymethylcellulose | Roeper |
| 1.5% by weight of soya or sunflower lecithin | Sternchemie |
| 0.3% by weight of citric acid (crystalline) | Merck KGaA |
| 0.05% by weight of potassium sorbate | Merck KGaA |
| 10% by weight of interference pigment from Example 2 | |

Preparation of the application medium:
Water is initially introduced with potassium sorbate and citric acid, stirred using a paddle stirrer, and the mixture is heated to a maximum of 80° C. During the heating, sodium carboxymethylcellulose is added with constant stirring. Stirring is continued (about 45 min.) until all the cellulose has dissolved. Alternatively, the mixture can be stirred for 3 h without supply of heat:
As soon as all the sodium carboxymethylcellulose has dissolved in the water, 1,2-propanediol and lecithin are added at room temperature, and stirring is continued until all the ingredients have distributed uniformly. The amount of pigment indicated is subsequently stirred in.
Colouring:
Eggs are hard-boiled and subsequently coloured by means of an application medium according to the invention. To this end, a small amount of the medium is placed on a glove. A glove is also worn on the other hand. The boiled egg should be warm and dry. The application medium is distributed uniformly on the warm egg shell by rapid rubbing to and fro in the hands. Due to the residual heat of the egg, the application medium dries quickly. A very uniform pigment colouring is obtained. The eggs can have white or brown shells, depending on the interference pigment selected.

Different pigment amounts from 2-17% by weight lead to different intensities of the resultant gloss effect.

The colour does not penetrate through the egg shell.

Example A27: Colouring of Chocolate and Pralines

Prepared pralines, chocolates and chocolate-coated products in general can be decorated afterwards with the interference pigment application medium.

Application medium:

| | |
|---|---|
| 60% by weight of water | |
| 20% by weight of ethanol (96% by vol.) | Merck KGaA |
| 5.75% by weight of 1,2-propanediol E1520 | Merck KGaA |
| 2.4% by weight of sodium carboxymethylcellulose | Roeper |
| 1.5% by weight of soya or sunflower lecithin | Sternchemie |
| 0.3% by weight of citric acid (crystalline) | Merck KGaA |
| 0.05% by weight of potassium sorbate | Merck KGaA |
| 10% by weight of interference pigment from Example 1 + optionally sweetener and/or flavour as desired | |

Preparation of the application medium as in Example A26.

Colouring:

The application medium is applied to the chocolate product areas to be coloured by means of a fine nozzle, spatula or by means of a brush. Drying is then carried out at room temperature until the colour coating has completely dried.

The viscosity of the medium can be reduced by means of further addition of water. This enables the medium, if necessary, to be applied better to certain product areas. This increases the drying time.

Example A28: Pre-Colouring of Chocolate Moulds

Application medium:

| | |
|---|---|
| 80% by weight of water | |
| 10.75% by weight of 1,2 propanediol E1520 | Merck KGaA |
| 2.4% by weight of sodium carboxymethylcellulose | Roeper |
| 1.5% by weight of soya or sunflower lecithin | Sternchemie |
| 0.3% by weight of citric acid (crystalline) | Merck KGaA |
| 0.05% by weight of potassium sorbate + | Merck KGaA |
| interference pigment from Example 2 | Merck KGaA |

Preparation of the application medium:

The components are mixed as described in Example A26. Before addition of the interference pigment, a further 50% by weight of water are added, and stirring is continued until everything has distributed homogeneously 5% by weight of interference pigment from Example 2 are added to this mixture.

Colouring:

Chocolate moulds made from plastic (for example polycarbonate) or metal can be pre-decorated very simply using the application medium according to the invention. The pigment-containing application medium is introduced into the mould at the desired points. The mould is subseuently dried in a fan-assisted oven or drying cabinet. The colouring of the mould can be carried out by suitable nozzles, pipettes, brushes or by hand.

The viscosity of the medium can be reduced by means of further addition of water. This enables the medium, if necessary, to be applied better to certain product areas. This increases the drying time.

Some of the water can optionally be replaced by ethanol (food grade 80-99.99% by vol.) in the preparation of the application medium. This accelerates the drying. 5-30% of the water can be replaced by ethanol.

Example A28.1

It is furthermore possible to colour chocolate products uniformly by hand analogously to Example A26.

Example A29: Decoration of Marzipan or Fondant Articles

Analogously to the decoration of chocolate and pralines (Example A27), it is also possible subsequently to decorate other confectionery, such as, for example, marzipan or fondant articles, with the application medium according to the invention.

In contrast to chocolate and pralines, these products can be dried at elevated temperatures after the application.

Otherwise, the recipe variations, production processes and colouring possibilities are as described in Example A27.

Example A30: Decoration, Colouring of Cereals

Application medium (base):

| | |
|---|---|
| 70% by weight of water | |
| 23% by weight of ethanol (96% by vol.) | Merck KGaA |
| 3.5% by weight of 1,2 propanediol E1520 | Merck KGaA |
| 2.0% by weight of sodium carboxymethylcellulose | Roeper |
| 1.2% by weight of soya or sunflower lecithin | Sternchemie |
| 0.25% by weight of citric acid (crystalline) | Merck KGaA |
| 0.05% by weight of potassium sorbate | Merck KGaA |

Optionally sweeteners and flavours as desired

Depending on the desired gloss and colour effect, the corresponding interference pigments, individually or in combination, or additionally other dyes or colouring fruit and plant extracts are then added to this base, prepared as in Example A26.

Example A30.1: Chocolate Cereals, Round, Extruded

Cereals are introduced into a pan. This is fitted with baffles. Drying air is switched on (40-50° C.)

Weight of cereals: 40 g

Application medium:

| | |
|---|---|
| 10% by weight of interference pigment from Example 1 | |
| 0.05% by weight of vegetable black | CHR Hansen |
| 89.95% by weight of application medium (base) | |

A total of 60 g (=15% of the amount of cereals) of application medium are applied little by little to the cereals rotating in the pan. 10 g of the application medium/application are applied. This is distributed over the cereals. Drying air is directed onto the cereals. As soon as an application has dried, a corresponding application amount can again be applied to the cereals, until the desired colour effect has been achieved. The cereals are subsequently dried, for example in a drying cabinet or oven, until the initial moisture is reached again.

Example A30.2: Chocolate Cereals, Round, Extruded

The process is as in Example A30.1.
Weight of cereals: 400 g
Application medium:
8% by weight of interference pigment from Example 3
92% by weight of application medium (base)
Application amount: 50 g (=12.5%)

Example A30.3: Corn Cereals, Oblong, Extruded

The process is as in Example A29.1.
Weight of cereals: 500 g
Application medium:
12% of interference pigment from Example 1
88% of application medium (base)
Application amount: 40 g (=8%)

Example A30.4: Colouring, Decoration of Popcorn

Example A30.4a: Sugared Popcorn

Weight of popcorn: 300 g
Application medium:
8% by weight of interference pigment from Example 2
92% by weight of application medium (base)
Application amount: 50 g (=16.67%)
A total of 50 g (=16.67%) of the application medium are applied little by little to the popcorn rotating in a pan. 10-15 g of the medium/application are applied. This is distributed on the popcorn while drying air is fed in. As soon as an application has dried, a further application amount can be applied to the popcorn, until the desired colour effect has been reached. The popcorn is subsequently dried, for example in a drying cabinet or oven, until the initial moisture is reached again.

Example A30.4b: Sugared Popcorn

Weight of popcorn: 300 g
Application medium:
10% by weight of interference pigment from Example 1
90% by weight of application medium (base)
Application amount: 60 g (=20%)

Example A31: Dragees (Chocolate, Sugar/Sugar-Free)

The application medium containing interference pigment is applied to the chocolate dragees rotating in the pan analogously to conventional coating by hand. Here too, layers are applied successively until the desired effect has been achieved. As soon as a layer has dried, a further addition can take place. A small application gives rise to a marble effect, while an increased application leads to a very uniform gloss colouring.
Application medium (base):

| | |
|---|---|
| 70% by weight of water | |
| 23% by weight of ethanol (96% by vol.) | Merck KGaA |
| 3.5% by weight of 1,2-propanediol E1520 | Merck KGaA |
| 2.0% by weight of sodium carboxymethylcellulose | Roeper |
| 1.2% by weight of soya or sunflower lecithin | Sternchemie |
| 0.25% by weight of citric acid (crystalline) | Merck KGaA |
| 0.05% by weight of potassium sorbate | Merck KGaA |

Optional addition of sweeteners and flavours. Ethanol content can be varied to adapt the recipe or also replaced entirely by water and 1,2-propanediol.

Example A31.1: Hazelnuts Coated with Dark Chocolate

Dragees are introduced into a pan. This is fitted with baffles. Drying air is switched on (25° C.)
Weight of dragees: 1000 g
Application medium:
10% by weight of pigment from Example 2
90% by weight of application medium base (composition as in Example A31, preparation as in Example A30.1)
Application amount: 80 g (=8%)

Example A31.2: Chocolate Coffee Beans Coated with Milk Chocolate

Preparation as in Example A30
Weight of dragees: 1200 g
Application medium:
10% by weight of interference pigment from Example 2
90% by weight of application medium (base)
Application amount: 95 g (=7.9%)

Example A31.3: Raisins Coated with White Chocolate

Preparation as in Example A30
Weight of dragees: 1000 g
Application medium: 8% by weight of interference pigment from Example 2
92% by weight of application medium (base)
Application amount: 60 g (=6%)

Example 31.4: Sugar-Coated Chocolate Beans, White

Weight of dragees: 1.000 g
Application medium:
8% by weight of interference pigment from Example 3
92% by weight of application medium (base)
Application amount: 100 g (=10%)

Example 31.5: Isomalt-Coated Chewing Gum Pellets, White

Weight of dragees: 1.000 g
Application medium:
8% by weight of interference pigment from Example 3
92% by weight of application medium (base)
Application amount: 80 g (=8%)

Example 31.6: Sugar-Coated Almonds, Copper-Red

Weight of dragees: 800 g
Application medium:
8% by weight of interference pigment from Example 3
92% by weight of application medium (base)
Application amount: 72 g (=9%)

Example A31.7: Further Surface Optimisation of Dragees

Both in the case of the chocolate-coated products (Examples A31.1-A31.3), and in the case of the sugar-coated or sugar-free-coated products (Examples A31.4-A31.6), the gloss and colour effect can be improved further if a mixture of shellac, ethanol and interference pigment is applied again after application of the application medium and a certain drying time. Ideally, this can be the interference pigment(s) already present in the medium, but other combinations are also possible. The shellac/ethanol/interference pigment mixture is applied by hand to the dragees rotating in the pan and dried by means of air. Alternatively, the mixture can also be sprayed.

Example A31.7a

Composition:
90% by weight of ethanolic shellac solution (2-50% shellac content) (for example Capol® 425 or Crystallac® (Mantrose-Haeuser Co., Inc.) 10% by weight of interference pigment from Example 1

Before addition of the interference pigment, the shellac solution can be diluted further with ethanol (for example 1 part of shellac solution diluted with twice or 5 times the amount of ethanol (food grade)

Application rate: 5-40 g/kg of product—depending on dilution Amount of interference pigment (from Example 1) in the shellac solution (2-50% shellac content)+1-40% of pigment; preferably: 5-25% of pigment

Example A32: Colouring of Pressed Tablets

A uniform colouring of the pressed tablets can be achieved by means of the following application medium, and a protective layer forms around the tablets. The colouring is carried out in the coating pan.

Application medium (base):

| | |
|---|---|
| 72% by weight of water | |
| 20% by weight of ethanol (96 Vol-%) | Merck KGaA |
| 4.5% by weight of 1,2-propanediol E1520 | Merck KGaA |
| 2.0% by weight of sodium carboxymethylcellulose | Roeper |
| 1.2% by weight of soya or sunflower lecithin | Sternchemie |
| 0.25% by weight of citric acid (crystalline) | Merck KGaA |
| 0.05% by weight of potassium sorbate | Merck KGaA |

Sweeteners and/or flavours can optionally be added in order to adapt the recipe. The ethanol content can be varied in order to adapt the recipe, or ethanol can also be replaced entirely by water and 1,2-propanediol.

Example A32.1: Peppermint Pressed Tablets, White

Weight of product: 500 g
Application medium:
8% by weight of interference pigment from Example 1
92% by weight of application medium (base)
Application amount: 40 g (=8%)

Example A32.2: Lemon Pressed Tablets, Yellow/Copper-Red

Weight of product: 500 g
Application medium:
6% by weight of interference pigment from Example 3
94% by weight of application medium (base)
Application amount: 50 g (=10%)

Example A33: Colouring, Decoration of Marshmallows

The application is carried out in a coating pan.
The process sequence is carried out as described in Example A31.

Example A33.1: Colouring of Marshmallows, White

Application medium (base):

| | |
|---|---|
| 72% by weight of water | |
| 20% by weight of ethanol (96% by vol) | Merck KGaA |
| 4.5% by weight of 1,2-propanediol E1520 | Merck KGaA |
| 2.0% by weight of sodium carboxymethylcellulose | Roeper |
| 1.2% by weight of soya or sunflower lecithin | Sternchemie |
| 0.25% by weight of citric acid (crystalline) | Merck KGaA |
| 0.05% by weight of potassium sorbate | Merck KGaA |

Weight of product: 300 g
Application medium:
10% by weight of interference pigment from Example 3
90% by weight of application medium (base)
Application amount: 51 g (=17%)

Example A33.2: Colouring of Marshmallows, Pale Green

Weight of product: 300 g
Application medium:
10% by weight of interference pigment from Example 3
90% by weight of application medium (base)
Application amount: 51 g (=17%)

Example A33.3: Colouring of Marshmallows, Pink

Weight of product: 300 g
Application medium:
8% by weight of interference pigment from Example 3
92% by weight of application medium (base)
Application amount: 42 g (=14%)

Example A34: Production of Decorative Lace and Decorative Sheets

Decorative lace is taken to mean filigree shapes and decorations produced by thinly spreading the first application medium in silicone moulds. After a certain drying time, these are removed from the moulds and can be used to decorate, for example, confectionery, ice cream, chocolate, eggs, pralines, bakery products, cakes and gateaux, desserts, patés, jelly loaves, or other foods. The drying time here can be adjusted so that the products still exhibit a certain elasticity.

It is also possible to use the decorations produced as edible body decorations. In this case, the decorations are applied to the corresponding body areas by means of suitable adhesives. When used as edible cosmetic, the paste can furthermore also be applied directly to body areas to be coloured. Body heat causes rapid drying on the skin.

Decorative sheets are taken to mean very thin, sheet-form structures produced by spreading the pigment medium very thinly on flat substrates. These substrates can consist, for example, a plastic or metal. After the spreading-out, the products are dried, for example in a drying cabinet or oven until completely dry. After drying, the decorative sheets can be removed from the substrates and can then be used as a whole, partly cut into small pieces or chopped correspondingly, for decoration of foods, as listed correspondingly, for example, in the case of the decorative lace described above.

Example A34.1: Decorative Lace Recipe

| | |
|---|---|
| 76% by weight of water | |
| 9.75% by weight of 1,2-propanediol E1520 | Merck KGaA |
| 2.4% by weight of sodium carboxymethylcellulose | Roeper |
| 1.5% by weight of soya or sunflower lecithin | Sternchemie |
| 0.3% by weight of citric acid (crystalline) | Merck KGaA |
| 0.05% by weight of potassium sorbate | Merck KGaA |
| 10% by weight of interference pigment from Example 1 | |

Sweeteners and/or flavours can optionally be added in order to adapt the recipe. The proportion of water and 1,2-propanediol can be varied in order to adapt the recipe customer-specifically.

Ethanol can likewise be added in order to accelerate drying.

After preparation, the application medium is spread thinly in silicone moulds and dried at about 70° C. in a drying cabinet for 2-3 hours. The decorations can then carefully be removed from the mould.

Example A34.2: Decorative Sheet Recipe

| | |
|---|---|
| 80% by weight of water | |
| 5.75% by weight of 1,2 propanediol E1520 | Merck KGaA |
| 2.4% by weight of sodium carboxymethylcellulose | Roeper |
| 1.5% by weight of soya or sunflower lecithin | Sternchemie |
| 0.3% by weight of citric acid (crystalline) | Merck KGaA |
| 0.05% by weight of potassium sorbate | Merck KGaA |
| 10% by weight of Interference pigment from Example 3 | |

Sweeteners and/or flavours can optionally be added in order to adapt the recipe. The proportion of water and 1,2-propanediol can be varied in order to adapt the recipe customer-specifically.

Ethanol can likewise be added in order to accelerate drying.

After preparation, the application medium is spread out very thinly on suitable substrates (plastic, metal etc.), and subsequently dried in a drying cabinet or oven at about 70° C. until completely dry. The decorative sheets can then be detached completely and used as a whole, partly cut up or cut into small pieces as decorations for food products, as described under decorative lace.

Example A35: Coloured Decorative Elements

Base composition for 3D shapes:

| | | |
|---|---|---|
| 88.25% by weight of water | | (A) |
| 0.05% by weight of potassium sorbate | (Merck KGaA) | (A) |
| 0.5% by weight of citric acid (crystalline) | (Merck KGaA) | (A) |
| 2.4% by weight of carboxymethylcellulose | (Roeper GmbH) | (B) |
| 7% by weight of 1,2-propanediol | (Merck KGaA) | (B) |
| 0.75% by weight of sunflower lecithin | (SternChemie GmbH & Co. KG) | (B) |

Flavour (as needed)
Sweetener (as needed)
Buffer salts for pH adjustment (as needed)

Addition of flavour, sweetener, buffer salts to 100%, offset by increasing or reducing the addition of water All ingredients (A) are mixed with stirring. Ingredients (B) are then mixed and added to A with vigorous stirring, and the mixture is stirred for a further 15-30 min. Owing to the rapid increase in viscosity that occurs here, the stirrer speed must be adjusted in order to ensure good mixing. Flavours and sweeteners can also be added after the mixing of (A) and (B). The pH is subsequently adjusted to 3.5 using citric acid or buffer salts. Food dyes, interference pigments (food grade), individually or in combination, are then stirred into this base composition.

Example A35.1: Coloured Base Compositions for 3D Shapes

Example A35.1a

| |
|---|
| 90% by weight of base composition for 3 D shapes |
| 10% by weight of interference pigment from Example 3 |

Example A35.1b

| |
|---|
| 89.7% by weight of base composition for 3 D shapes |
| 10% by weight of interference pigment from Example 3 |
| 0.3% by weight of vegetable black E153(Roha Europe S.L.U.) |

Example A35.1c

| |
|---|
| 89% by weight of base composition for 3 D shapes |
| 10% by weight of interference pigment from Example 3 |
| 1% by weight of beetroot concentrate E160 (Chr. Hansen A/S) |

Example A35.1d 88.96% by weight of base composition for 3D shapes
10% by weight of interference pigment from Example 3
0.04% by weight of E124 (Roha Europe S.L.U.)

Example A35.1e 91.94% by weight of base composition for 3D shapes
8% by weight of interference pigment from Example 3
0.06% by weight of E120 (Fiorio Colori SpA)

Example A35.1f

91% by weight of base composition for 3D shapes
8% by weight of interference pigment from Example 3
1% by weight of E171 (Merck KGaA)

Example A35.1g

92% by weight of base composition for 3D shapes
7% by weight of interference pigment from Example 3

1% by weight of red-coloured plant extract (Rudolf Wild GmbH & Co. KG)

Example A35.1h 89.5% by weight of base composition for 3D shapes
10% by weight of interference pigment from Example 3
0.5% by weight of vegetable black E153 (Roha Europe S.L.U.)

Example A35.1i

94% by weight of base composition for 3D shapes
6% by weight of interference pigment from Example 2

Example A35.1j 99.7% by weight of base composition for 3D shapes
0.3% by weight of E110 (Roha Europe S.L.U.)

Example A35.1k 99.7% by weight of base composition for 3D shapes
0.3% by weight of E129 (Roha Europe S.L.U.)
0.2% by weight of E131 (Roha Europe S.L.U.)

Example A35.1l

91% by weight of base composition for 3D shapes
9% by weight of interference pigment from Example 1

Example A35.1m

93% by weight of base composition for 3D shapes
7% by weight of interference pigment from Example 3

Example A35.1n

93% by weight of base composition for 3D shapes
6% by weight of interference pigment from Example 3
1% by weight of silicon dioxide (Aerosil) (Evonik Industries)

The coloured base compositions of Examples A35.1a to A35.1 n are filled into negative moulds made from metal, plastic and silicone and dried for 8-12 h at 25° C. and then for 10-14 h at 40° C. either in a drying cabinet, air-conditioned drying room or oven. Depending on the air circulation or air humidity that can be set, the requisite drying time can be reduced correspondingly. An excessively high temperature at the beginning of drying leads to strong, less permeable film formation on the surface of the composition, meaning that further drying of the underlying composition is greatly retarded or even prevented.

Example A36: Film or Surface Decoration

Example A36.1

Base composition for film or surface decoration:

| 10% by weight of ethanol (96%; "food grade") | (Merck KGaA) | (A) |
| 84.95% by weight of water | | (A) |
| 0.05% by weight of potassium sorbate | Merck KGaA | (A) |
| Citric acid (as needed) | Merck KGaA | (A) |
| 1.5% by weight of carboxymethylcellulose | Roeper GmbH | (B) |
| 3% by weight of 1,2 propanediol | Merck KGaA | (B) |
| 0.5% by weight of sunflower lecithin | SternChemie GmbH & Co. KG | (B) |
| Flavour (as needed) | | |
| Sweetener (as needed) | | |
| Buffer salts for pH adjustment (as needed) | | |

Addition of flavour, sweetener, buffer salts to 100%, offset by increasing or reducing the addition of water Example A36.2

Alternative recipe without addition of ethanol

| 94.55% by weight of water | | (A) |
| 0.05% by weight of potassium sorbate | Merck KGaA | (A) |
| Citric acid (as needed) | Merck KGaA | (A) |
| 1.8% by weight of carboxymethylcellulose | Roeper GmbH | (B) |
| 3% by weight of 1,2 propanediol | Merck KGaA | (B) |
| 0.5% by weight of sunflower lecithin | SternChemie GmbH & Co. KG | (B) |
| Flavour (as needed) | | |
| Sweetener (as needed) | | |
| Buffer salts for pH adjustment (as needed) | | |

Addition of flavour, sweetener, buffer salts to 100%, offset by increasing or reducing the addition of water All ingredients (A) are mixed with stirring. Ingredients (B) are then mixed and added to (A) with vigorous stirring.

Flavours and sweeteners can also be added after the mixing of (A) and (B). The pH is subsequently adjusted to about 3.5 using citric acid or buffer salts.

The interference pigment from Examples 1 to 3, individually or in combination, is then stirred into the base composition.

Example A36.3: Production of 3D Elements 3D elements are produced by filling the finished base composition (see Example A36.1) into suitable moulds. Plastic or metal moulds, for example, as are also used analogously for the production of chocolate pralines or chocolate figures, marzipan figures, etc., are suitable here. Silicone moulds are less suitable owing to their worse heat conduction. The amount of 3D composition introduced depends on the viscosity and desired height of the 3D shapes and can be selected individually. However, it should be noted that more filling composition also means an extended drying time.

The filled moulds are then dried. It is important here that the drying process does not take place too quickly at excessively high temperatures, i.e. excessively high drying temperatures are not be selected in particular at the beginning of drying. In this case, the surface of the composition would dry out, preventing further moisture from escaping from deeper layers. This thus leads to partial drying-out of individual zones of the base composition, resulting in stresses within the composition, which lead to deformations and thus uneven drying-out of the base composition in the mould, with the consequence of irregular surface deformations.

Air inclusions can likewise no longer escape upwards and lead to flaws during drying. Low air humidity values support the drying in a positive manner here.

For this reason, the drying should begin slowly and at a low temperature—best overnight—over several hours, for example at room temperature 20-35° C., 24 h. If the composition has already very substantially adapted to the mould after the first drying phase (after about 6-10h), the final drying can be carried out at a higher temperature in a drying cabinet or drying room. Temperatures of 30 to 45° C. have proven successful here.

When the drying is complete, the finished 3D shapes can easily be removed by hand, or they fall out of the moulds by themselves. Chocolate, for example, can also be filled into the moulds analogously. After cooling, the now-decorated chocolate can be removed from the mould.

The more base composition is introduced, the longer the drying time lasts.

The drying is divided into a longer, first phase at (about room temperature –30° C.), and a second shorter drying phase at higher temperatures (about 30-40° C.). High air humidity extends the drying time, and should preferably be avoided.

Chocolate: the shapes produced in this way can be applied to finished chocolate products for decoration, or can also themselves be filled with chocolate. This can even take place in the mould itself.

Example A36.4: Further Use of the Base Composition

Example A36.4a: Films and Flakes

The ready-prepared base composition from Example A36.2 can alternatively also be spread out evenly over flat plastic or metal surfaces by means of a knife or spatula, etc. After subsequent drying, a thin layer is obtained which can either itself be used as a film for decorating foods or, divided into small pieces or shapes, can be applied as small flakes or decorations to foods of all types for decoration.

Example A36.4b: Direct Product Decoration

The finished base composition from Example A36.2 can also be used directly as such for decoration, for example for chocolate products. In this case, the 3D composition is applied thinly to the product areas to be coloured. After corresponding drying (see A36.3), decorated surfaces are obtained in which the composition has adapted precisely to the structure of the product surface. Apart from chocolate, other foods, such as, for example, cookies or cakes, can also be decorated simply and efficiently in this way. The drying time can be reduced by, for example, adding ethanol and/or reducing the amount of propanediol and/or the amount of Na carboxymethylcellulose.

Example A36.4c: Decorative Interlayers

Decorative stripes can also be produced in chocolate products. This is carried out by, for example, first filling the mould with a little warm chocolate, allowing this to cool, and subsequently adding the base composition in a thin layer over the chocolate. After the obligatory drying time, the mould can be filled with a further layer of warm chocolate. After cooling of the second chocolate layer, this thus gives a chocolate figure with a coloured intermediate decorative stripe. This is visible very well on the side of the chocolate figure.

Example A37: Packet sSoups

Procedure for Examples A37.1-A37.11

The amounts of instant soup and interference pigment given in the table are mixed by shaking, and the mixtures prepared are stirred into the amounts of boiling water given in the examples. Boiling is then continued for a further 5 minutes. After boiling, the added interference pigment is clearly visible both in the liquid phase of the soup and also on the ingredients, such as, for example, the noodles.

| No. | Instant soup | Amount of soup | Interference pigment | Addition of boiling water |
|---|---|---|---|---|
| 1 | Maggi "Alphabet Soup" | 97.5 g | Interference pigment from Example 1 2.5 g | 1000 ml |
| 2 | Maggi "Spring Soup" | 62 g | Interference pigment from Example 3 1 g | 1000 ml |
| 3 | Maggi "Fireman Soup" | 58.5 g | Interference pigment from Example 1 1.5 g | 1000 ml |
| 4 | Maggi "Fireman Soup" | 58 g | Interference pigment from Example 3 2g | 1000 ml |
| 5 | Maggi "Rider Soup" | 97 g | Interference pigment from Example 2 3g | 1000 ml |
| 6 | Maggi "Star Soup" | 95 g | Interference pigment from Example 3 5g | 750 ml |
| 7 | Knorr "Alphabet Soup" | 77.5 g | Interference pigment from Example 1 4.5 g | 750 ml |
| 8 | Knorr "Number Soup" | 76.5 g | Interference pigment from Example 1 7.5 g | 750 ml |
| 9 | Knorr "Number Soup" | 81 g | Interference pigment from Example 1 3g | 750 ml |
| 10 | Knorr "Alphabet Soup" | 81.4 g | Interference pigment from Example 2 0.6 g | 750 ml |
| 11 | Maggi "Star Soup" | 95 g | Interference pigment from Example 1 6g | 1000 ml |

Example A38: Vegan Bread Spread 640 g of smoked tofu*
150 g of kidney beans (can, drained)*
150 g of sunflower or rapeseed oil*
30 g of roasted onions*
5 g of paprika powder, smoked*
Herbs: marjoram, oregano*
Salt, pepper*
10-20 g of interference pigment from Example 3 (1-2%), depending on the desired colouration All *ingredients are finely ground by means of a Turrax/hand blender to give a puree.

The interference pigment is then added and stirred uniformly into the product.

The vegan spread can subsequently be stored in the refrigerator (about 1 week), or heated at 100° C. for 20 minutes in a suitable, sealed container. It must be noted here that in this case the proportion of herbs may have to be adjusted. Storage in the sealed container at room temperature is then possible over an extended period.

Due to the very good heat stability of the interference pigments, no loss in colour occurs here

The invention claimed is:

1. Interference pigment based on a substrate mixture, wherein the substrate mixture consists of $SiO_2$ flakes, which $SiO_2$ flakes have at least 4 different thicknesses, and which $SiO_2$ flakes are coated with at least one high-refractive-index layer.

2. The interference pigment according to claim 1, wherein the $SiO_2$ flakes have 4, 5, 6, 7 or 8 different layer thicknesses.

3. The interference pigment according to claim 1, wherein the $SiO_2$ flakes differ in layer thicknesses by in each case at least 10 nm.

4. The interference pigment according to claim 1, wherein the layer thicknesses of the $SiO_2$ flakes are from 100-1000 nm.

5. The interference pigment according to claim 1, wherein the substrate mixture contains at least 4 $SiO_2$ flakes from the following group of $SiO_2$ flakes:

$SiO_2$ flakes having a layer thickness of 360 nm
$SiO_2$ flakes having a layer thickness of 380 nm
$SiO_2$ flakes having a layer thickness of 400 nm
$SiO_2$ flakes having a layer thickness of 420 nm
$SiO_2$ flakes having a layer thickness of 440 nm
$SiO_2$ flakes having a layer thickness of 460 nm
$SiO_2$ flakes having a layer thickness of 480 nm
$SiO_2$ flakes having a layer thickness of 500 nm
or
$SiO_2$ flakes having a layer thickness of 360 nm
$SiO_2$ flakes having a layer thickness of 380 nm
$SiO_2$ flakes having a layer thickness of 400 nm
$SiO_2$ flakes having a layer thickness of 420 nm
$SiO_2$ flakes having a layer thickness of 440 nm
$SiO_2$ flakes having a layer thickness of 460 nm
$SiO_2$ flakes having a layer thickness of 480 nm
or
$SiO_2$ flakes having a layer thickness of 300 nm
$SiO_2$ flakes having a layer thickness of 320 nm
$SiO_2$ flakes having a layer thickness of 340 nm
$SiO_2$ flakes having a layer thickness of 360 nm
$SiO_2$ flakes having a layer thickness of 380 nm
$SiO_2$ flakes having a layer thickness of 400 nm
$SiO_2$ flakes having a layer thickness of 420 nm
$SiO_2$ flakes having a layer thickness of 440 nm
or
$SiO_2$ flakes having a layer thickness of 300 nm
$SiO_2$ flakes having a layer thickness of 310 nm
$SiO_2$ flakes having a layer thickness of 340 nm
$SiO_2$ flakes having a layer thickness of 350 nm
$SiO_2$ flakes having a layer thickness of 370 nm
$SiO_2$ flakes having a layer thickness of 380 nm
or
$SiO_2$ flakes having a layer thickness of 400 nm
$SiO_2$ flakes having a layer thickness of 420 nm
$SiO_2$ flakes having a layer thickness of 440 nm
$SiO_2$ flakes having a layer thickness of 460 nm
$SiO_2$ flakes having a layer thickness of 480 nm
$SiO_2$ flakes having a layer thickness of 500 nm
$SiO_2$ flakes having a layer thickness of 520 nm.

6. The interference pigment according to claim 1, wherein the substrate mixture consists of the following $SiO_2$ flakes:

$SiO_2$ flakes having a layer thickness of 360 nm
$SiO_2$ flakes having a layer thickness of 380 nm
$SiO_2$ flakes having a layer thickness of 400 nm
$SiO_2$ flakes having a layer thickness of 420 nm
$SiO_2$ flakes having a layer thickness of 440 nm
$SiO_2$ flakes having a layer thickness of 460 nm
$SiO_2$ flakes having a layer thickness of 480 nm
$SiO_2$ flakes having a layer thickness of 500 nm.

7. The interference pigment according to claim 1, wherein the substrate mixture is coated with at least one high-refractive-index layer having a refractive index of n>1.8.

8. The interference pigment according to claim 1, wherein the high-refractive-index layer is selected from the group consisting of metal oxides, BiOCl, metal hydroxides, metals, metal sulfides and mixtures thereof.

9. The interference pigment according to claim 1, wherein the high-refractive-index layer is selected from the group consisting of $TiO_2$, $Fe_2O_3$, FeOOH, $Fe_3O_4$, $ZrO_2$, $SnO_2$, ZnO, BiOCl and mixtures thereof.

10. The interference pigment according to claim 1, wherein the flakes are coated with $TiO_2$, $Fe_2O_3$, FeOOH, $Fe_3O_4$ or a mixture thereof.

11. The interference pigment according to claim 1, wherein the $SiO_2$ flakes are coated with at least one high-refractive-index layer and at least one low-refractive-index layer.

12. The interference pigment according to claim 1, wherein the substrate mixture containing $SiO_2$ flakes is coated with alternating layers of at least one high-refractive-index layer and at least one low-refractive index layer.

13. The interference pigment according to claim 1, wherein the low-refractive-index layer is selected from the group consisting of $SiO_2$, MgO and $MgO*SiO_2$.

14. The interference pigment according to claim 1, wherein the $SiO_2$ flakes have a surface coating selected from the group consisting of:

substrate mixture+$TiO_2$
substrate mixture+$Fe_2O_3$
substrate mixture+FeOOH
substrate mixture+$Fe_3O_4$
substrate mixture+$TiO_2$/$Fe_2O_3$
substrate mixture+$TiO_2$+$Fe_2O_3$
substrate mixture+$TiO_2$+FeOOH
substrate mixture+$TiO_2$+$Fe_3O_4$
substrate mixture+$TiO_2$+$SiO_2$
substrate mixture+$Fe_2O_3$+$SiO_2$
substrate mixture+FeOOH+$SiO_2$
substrate mixture+$Fe_3O_4$+$SiO_2$
substrate mixture+$TiO_2$+$SiO_2$/$Al_2O_3$
substrate mixture+$TiO_2$+$Al_2O_3$
substrate mixture+$Fe_2O_3$+$Al_2O_3$
substrate mixture+FeOOH+$Al_2O_3$
substrate mixture+$Fe_3O_4$+$Al_2O_3$
substrate mixture+$Cr_2O_3$
substrate mixture+$SnO_2$
substrate mixture+$SiO_2$
substrate mixture+$ZrO_2$
substrate mixture+ZnO
substrate mixture+$TiO_2$+$SiO_2$+$TiO_2$
substrate mixture+$TiO_2$+$Al_2O_3$+$TiO_2$
substrate mixture+$TiO_2$+$MgO*SiO_2$+$TiO_2$
substrate mixture+$TiO_2$+$CaO*SiO_2$+$TiO_2$
substrate mixture+$TiO_2$+$Al_2O_3*SiO_2$+$TiO_2$
substrate mixture+$TiO_2$+$B_2O_3*SiO_2$+$TiO_2$
substrate mixture+$Fe_2O_3$+$SiO_2$+$TiO_2$
substrate mixture+$Fe_2O_3$+$SiO_2$+$TiO_2$
substrate mixture+$Fe_2O_3$+$SiO_2$+$Fe_2O_3$
substrate mixture+$Fe_2O_3$+$SiO_2$+$SnO_2$+$Fe_2O_3$
substrate mixture+$Fe_2O_3$+$Al_2O_3$+$TiO_2$
substrate mixture+$Fe_2O_3$+$Al_2O_3$+$Fe_2O_3$
substrate mixture+$Fe_2O_3$+$MgO*SiO_2$+$TiO_2$ substrate mixture+$Fe_2O_3$+CaO*$SiO_2$+$TiO_2$
substrate mixture+$Fe_2O_3$+$Al_2O_3$*$SiO_2$+$TiO_2$
substrate mixture+$Fe_2O_3$+$B_2O_3$*$SiO_2$+$TiO_2$
substrate mixture+$Fe_2O_3$+MgO*$SiO_2$+$Fe_2O_3$
substrate mixture+$Fe_2O_3$+CaO*$SiO_2$+$Fe_2O_3$
substrate mixture+$Fe_2O_3$+$Al_2O_3$*$SiO_2$+$Fe_2O_3$
substrate mixture+$Fe_2O_3$+$B_2O_3$*$SiO_2$+$Fe_2O_3$
substrate mixture+$TiO_2/Fe_2O_3$+$SiO_2$+$TiO_2$
substrate mixture+$TiO_2/Fe_2O_3$+$Al_2O_3$+$TiO_2$
substrate mixture+$TiO_2/Fe_2O_3$+MgO*$SiO_2$+$TiO_2$
substrate mixture+$TiO_2/Fe_2O_3$+CaO*$SiO_2$+$TiO_2$
substrate mixture+$TiO_2/Fe_2O_3$+$Al_2O_3$*$SiO_2$+$TiO_2$
substrate mixture+$TiO_2/Fe_2O_3$+$B_2O_3$*$SiO_2$+$TiO_2$
substrate mixture+$TiO_2$+$SiO_2$+$TiO_2/Fe_2O_3$
substrate mixture+$TiO_2/Fe_2O_3$+$SiO_2$+$TiO_2/Fe_2O_3$
substrate mixture+$TiO_2/Fe_2O_3$+MgO*$SiO_2$+$TiO_2/Fe_2O_3$
substrate mixture+$TiO_2$+$Al_2O_3$+$TiO_2/Fe_2O_3$
substrate mixture+$TiO_2$+MgO*$SiO_2$+$TiO_2/Fe_2O_3$
substrate mixture+$TiO_2$+CaO*$SiO_2$+$TiO_2/Fe_2O_3$
substrate mixture+$TiO_2$+$Al_2O_3$*$SiO_2$+$TiO_2/Fe_2O_3$
substrate mixture+$TiO_2$+$B_2O_3$*$SiO_2$+$TiO_2/Fe_2O_3$
substrate mixture+$TiO_2$+$Al_2O_3$+$Fe_2O_3$
substrate mixture+$TiO_2$+MgO*$SiO_2$+$Fe_2O_3$
substrate mixture+$TiO_2$+CaO*$SiO_2$+$Fe_2O_3$
substrate mixture+$TiO_2$+$Al_2O_3$*$SiO_2$+$Fe_2O_3$
substrate mixture+$TiO_2$+$B_2O_3$*$SiO_2$+$Fe_2O_3$
substrate mixture+$SnO_2$+$TiO_2$
substrate mixture+$SnO_2$+$Fe_2O_3$
substrate mixture+$SnO_2$+FeOOH and
substrate mixture+$SnO_2$+$Fe_3O_4$.

15. A process for the preparation of the interference pigments according to claim 1, comprising coating a mixture of $SiO_2$ flakes having at least 4 different layer thicknesses-is-coated with at least one high-refractive-index layer.

16. A product selected from the group consisting of paints, coatings, printing inks, security printing inks, plastics, ceramic materials, glazes, glasses, cosmetic formulations, pigment preparations, dry preparations, food colouring and pharmaceutical products colouring comprising the interference pigments according to claim 1.

17. A formulation comprising the interference pigment according to claim 1.

18. The formulation according to claim 17, further comprising at least one constituent selected from the group consisting of absorbents, astringents, antimicrobial substances, antioxidants, antiperspirants, antifoaming agents, anti-dandruff active compounds, antistatics, binders, biological additives, bleaches, chelating agents, deodorants, emollients, emulsifiers, emulsion stabilisers, dyes, humectants, film formers, fillers, fragrances, flavours, insect repellents, preservatives, anticorrosion agents, cosmetic oils, solvents, oxidants, plant constituents, buffer substances, reducing agents, surfactants, propellant gases, opacifiers, UV filters, UV absorbers, denaturing agents, aloe vera, avocado oil, coenzyme Q10, green tea extract, viscosity regulators, perfume, vitamins, enzymes, trace elements, proteins, carbohydrates, essential fats, minerals, natural dyes, nature-identical dyes, vegetable black, acids, sugars, fats, flavour enhancers, dyes, flavours, sweeteners, colouring fruit extracts, colouring plant extracts, cocoa, wax, gum arabic, cellulose, cellulose derivatives, starch, spirulina, albumen, albumen derivatives, and carrageenan.

* * * * *